United States Patent
Wang et al.

(10) Patent No.: US 12,015,952 B2
(45) Date of Patent: Jun. 18, 2024

(54) RESOURCE MANAGEMENT METHOD, CONTROL INFORMATION TRANSMISSION METHOD AND INFORMATION CONFIGURATION METHOD

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/424,134

(22) PCT Filed: Mar. 23, 2020

(86) PCT No.: PCT/KR2020/003923
§ 371 (c)(1),
(2) Date: Jul. 19, 2021

(87) PCT Pub. No.: WO2020/197205
PCT Pub. Date: Oct. 1, 2020

(65) Prior Publication Data
US 2022/0132376 A1    Apr. 28, 2022

(30) Foreign Application Priority Data

Mar. 28, 2019 (CN) .......................... 201910245816.3
Aug. 12, 2019 (CN) .......................... 201910741035.3

(51) Int. Cl.
*H04W 28/26* (2009.01)
*H04L 5/00* (2006.01)
(Continued)

(52) U.S. Cl.
CPC .......... *H04W 28/26* (2013.01); *H04L 5/0053* (2013.01); *H04W 28/24* (2013.01); *H04W 72/27* (2023.01);
(Continued)

(58) Field of Classification Search
None
See application file for complete search history.

(56) References Cited

U.S. PATENT DOCUMENTS

2012/0300616 A1    11/2012   Zeng et al.
2013/0329628 A1    12/2013   Yang
(Continued)

FOREIGN PATENT DOCUMENTS

CN    101908955 A    12/2010
CN    102076041 A    5/2011
(Continued)

OTHER PUBLICATIONS

Supplementary European Search Report dated Dec. 23, 2021, in connection with European Application No. 00779626.9, 9 pages.
(Continued)

*Primary Examiner* — Xavier S Wong

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present application provide a resource management method, a control information trans-
(Continued)

mission method, and an information configuration method, which belong to the field of communication technology.

12 Claims, 5 Drawing Sheets

(51) Int. Cl.
| | | |
|---|---|---|
| *H04W 28/24* | (2009.01) | |
| *H04W 72/27* | (2023.01) | |
| *H04W 76/11* | (2018.01) | |
| *H04W 84/04* | (2009.01) | |
| *H04W 92/12* | (2009.01) | |

(52) U.S. Cl.
CPC .......... *H04W 76/11* (2018.02); *H04W 84/047* (2013.01); *H04W 92/12* (2013.01)

(56) References Cited

U.S. PATENT DOCUMENTS

| | | | |
|---|---|---|---|
| 2014/0160939 A1 | 6/2014 | Arad et al. | |
| 2017/0347302 A1 | 11/2017 | Li et al. | |
| 2018/0092139 A1 | 3/2018 | Novlan et al. | |
| 2019/0014533 A1* | 1/2019 | Abedini | H04W 74/008 |
| 2020/0008250 A1 | 1/2020 | Wang et al. | |
| 2021/0195675 A1* | 6/2021 | Park | H04W 88/14 |
| 2021/0235332 A1* | 7/2021 | Schmidt | H04W 36/30 |
| 2021/0385747 A1* | 12/2021 | Prasad | H04W 52/0206 |

FOREIGN PATENT DOCUMENTS

| | | | |
|---|---|---|---|
| CN | 102573074 A | 7/2012 | |
| CN | 102742338 A | 10/2012 | |
| CN | 106162730 A | 11/2016 | |
| CN | 106465128 A | 2/2017 | |
| CN | 106572480 A | 4/2017 | |
| CN | 108924930 A | 11/2018 | |
| EP | 2989843 A1 | 3/2016 | |
| EP | 3136779 A1 | 3/2017 | |
| WO | 2010139217 A1 | 12/2010 | |
| WO | 2014173465 A1 | 10/2014 | |

OTHER PUBLICATIONS

3GPP TR 38.874 1.0.0 (Nov. 2018), Technical Report, 3rd Generation Partnership Project; Technical Specification Group Radio Access Network; Study on Integrated Access and Backhaul; (Release 15), Nov. 2018, 107 pages.

Zte, et al., "Discussion on BH RLC channel configuration in IAB network," R2-1900565, 3GPP TSG RAN WG2 Meeting #105, Athens, Greece, Feb. 25-Mar. 1, 2019, 4 pages.

Samsung, "QoS framework in IAB network", 3GPP TSG-RAN WG2 Meeting #105, Feb. 25-Mar. 1, 2019, R2-1900902, 9 pages.

Catt, "Common design and QoS Handling for IAB", 3GPP TSG-RAN WG2 Meeting #105, Feb. 25-Mar. 1, 2019, R2-1900243, 4 pages.

Ericsson, "QoS Mapping to Backhaul Bearers in IAB Networks", 3GPP TSG RAN WG2 Meeting #105, Feb. 25-Mar. 1, 2019, R2-1901323, 3 pages.

"3rd Generation Partnership Project; Technical Specification Group Radio Access Network; NR; Study on Integrated Access and Backhaul; (Release 16)", 3GPP TR 38.874 V16.0.0 (Dec. 2018), 111 pages.

"3rd Generation Partnership Project; Technical Specification Group Radio Access Network; NG-RAN; F1 application protocol (F1AP)(Release 15)", 3GPP TS 38.473 V15.5.0 (Mar. 2019), 198 pages.

"3rd Generation Partnership Project; Technical Specification Group Radio Access Network; NG-RAN; NR user plane protocol (Release 15)", 3GPP TS 38.425 V15.5.0 (Mar. 2019), 22 pages.

"3rd Generation Partnership Project; Technical Specification Group Radio Access Network; NR; Radio Resource Control (RRC) protocol specification (Release 15)", 3GPP TS 38.331 V15.5.0 (Mar. 2019), 491 pages.

"3rd Generation Partnership Project; Technical Specification Group Services and System Aspects; System Architecture for the 5G System; Stage 2 (Release 15)", 3GPP TS 23.501 V15.5.0 (Mar. 2019), 240 pages.

International Search Report of the International Searching Authority dated Jun. 29, 2020 in connection with International Application No. PCT/KR2020/003923, 3 pages.

Written Opinion of the International Searching Authority dated Jun. 29, 2020 in connection with International Application No. PCT/KR2020/003923, 4 pages.

First Office Action dated May 8, 2024, in connection with Chinese Application No. 201910741035.3, 21 pages.

LG Electronics, "Resource Allocation and Downlink Control Channel Structure for Relay Backhaul Link," R1-092115, 3GPP TSG RAN WG1 Meeting #57, San Francisco, USA, May 4-8, 2009, 7 pages.

Islam, et al., "Investigation of Performance in Integrated Access and Backhaul Networks," 2018 IEEE Conference on Computer Communications Workshops (Infocom Wkshps), 2018, 6 pages.

ZTE, "Discussion on backhaul bearer setup in IAB network," R2-1814703, 3GPP TSG-RAN WG2#103bis, Chengdu, China, Oct. 8-12, 2018, 9 pages.

* cited by examiner

[Fig. 1]
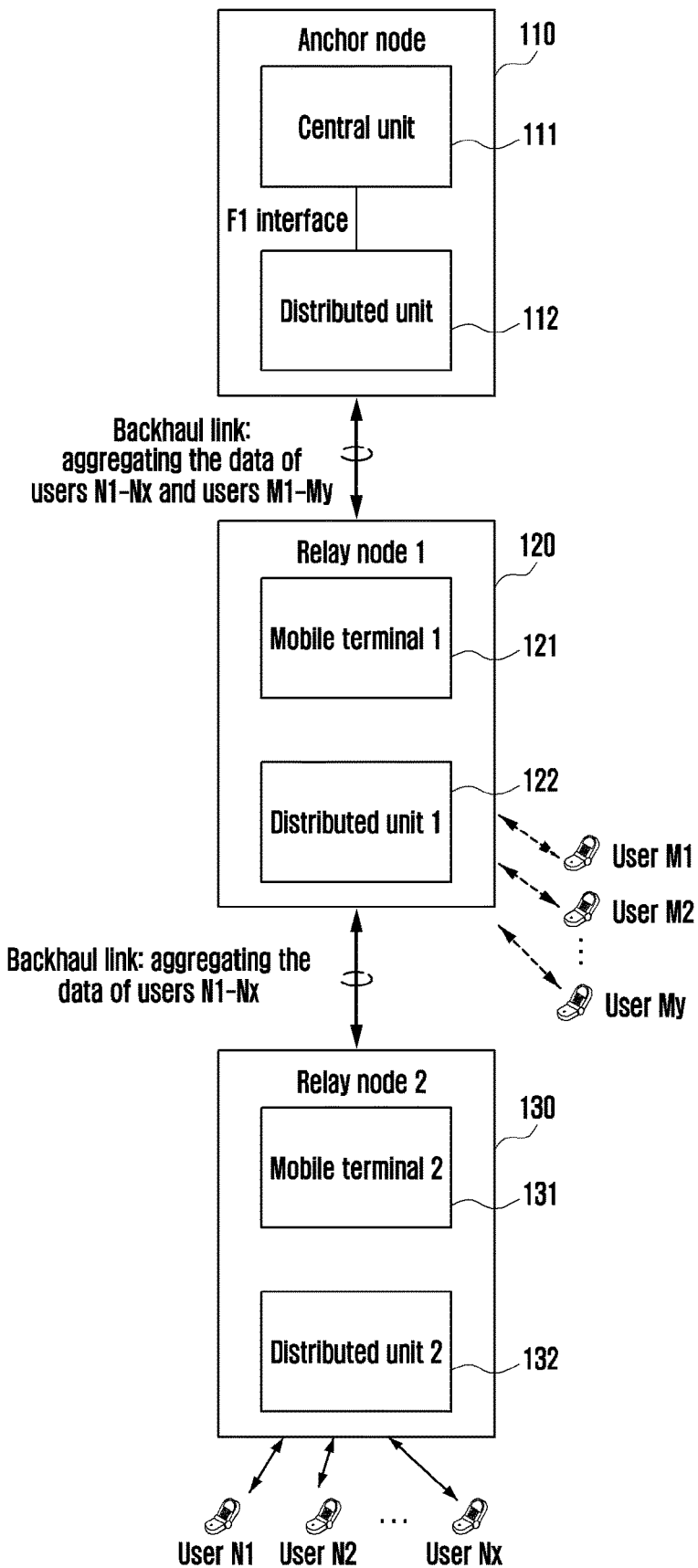

[Fig. 2]
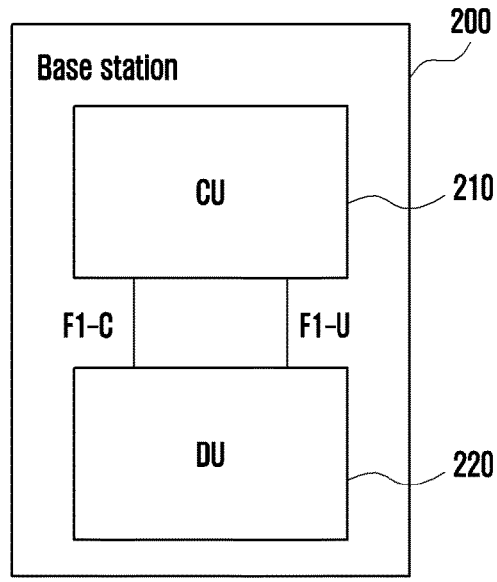
[Fig. 3]
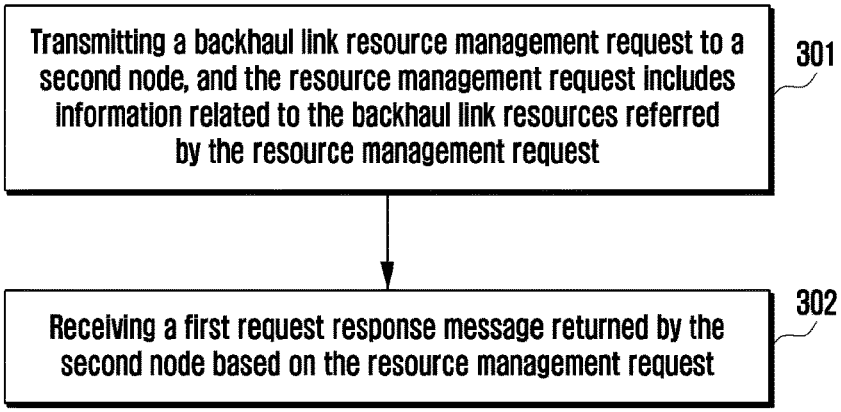
[Fig. 4]
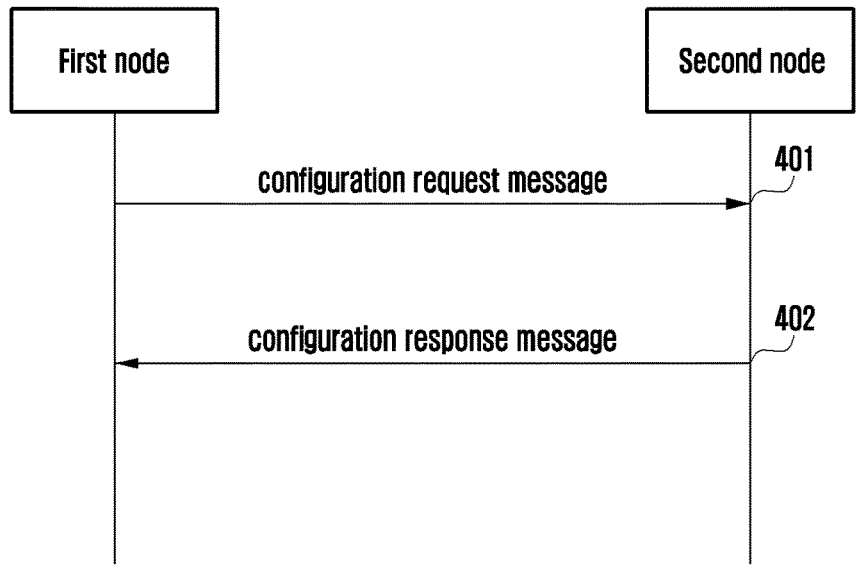

[Fig. 5]
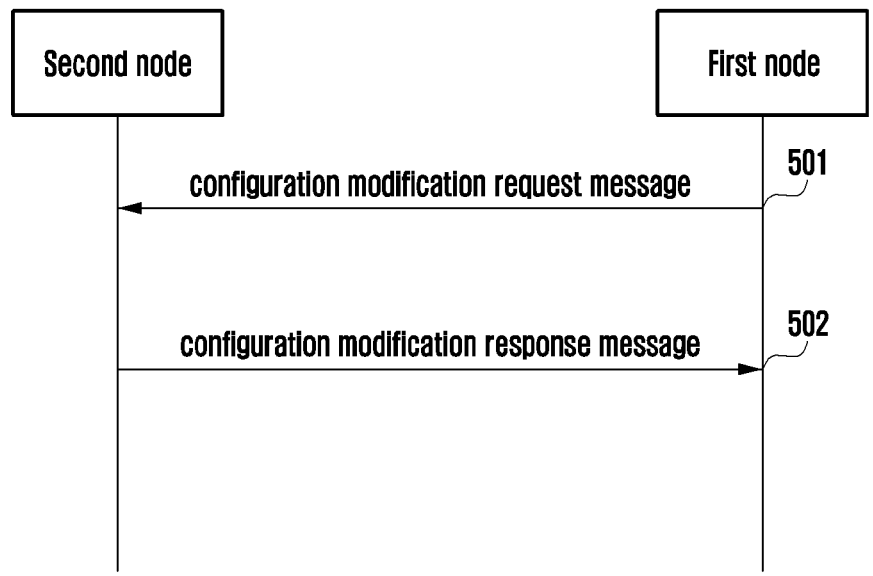
[Fig. 6]
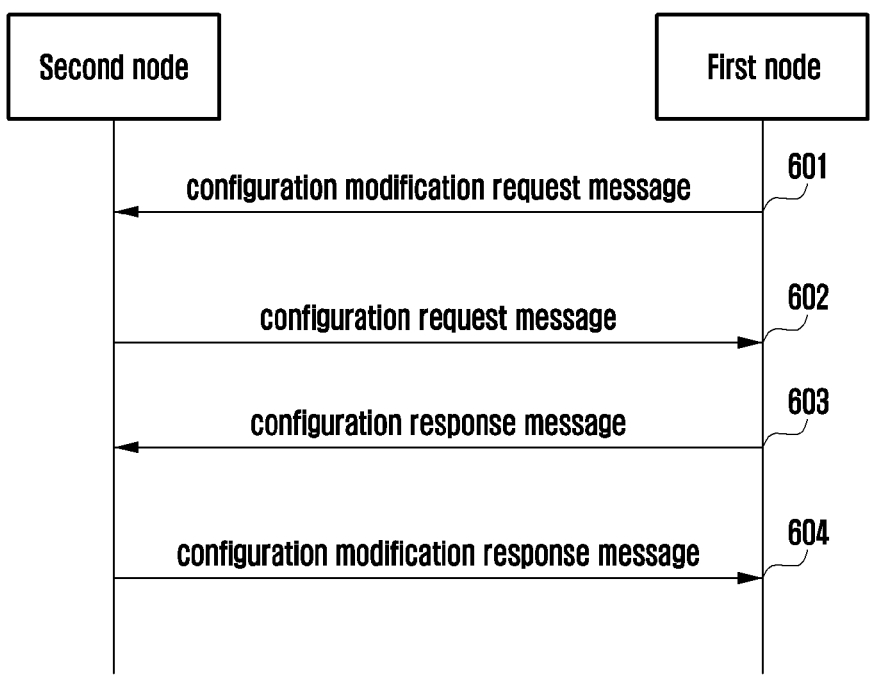

[Fig. 7]
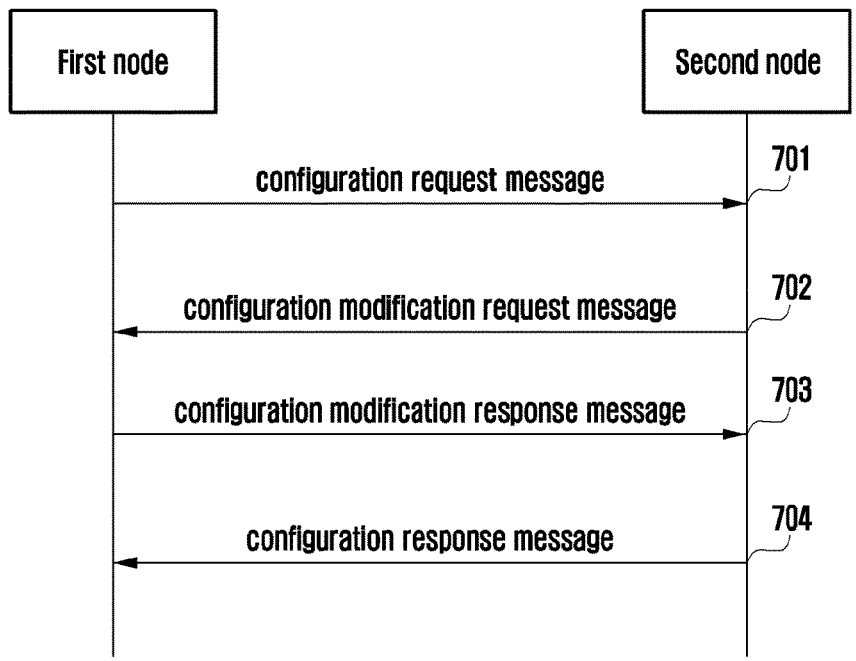
[Fig. 8]
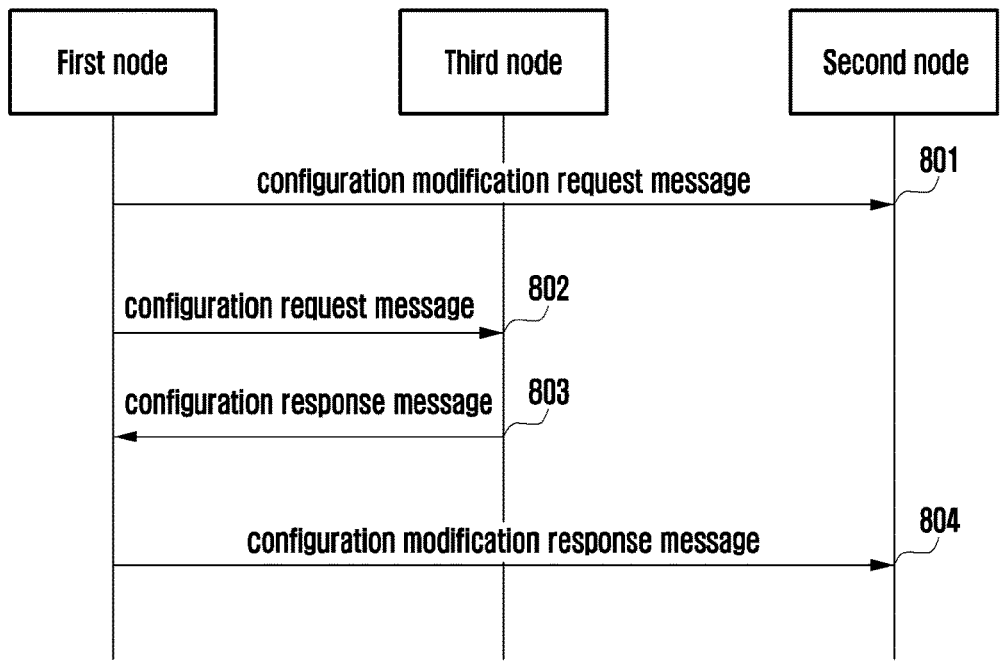
[Fig. 9]
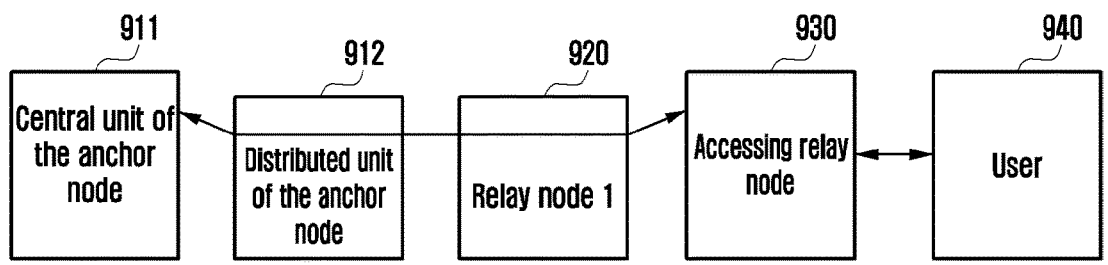

[Fig. 10]
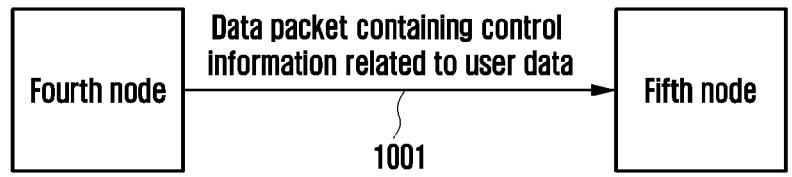
[Fig. 11]
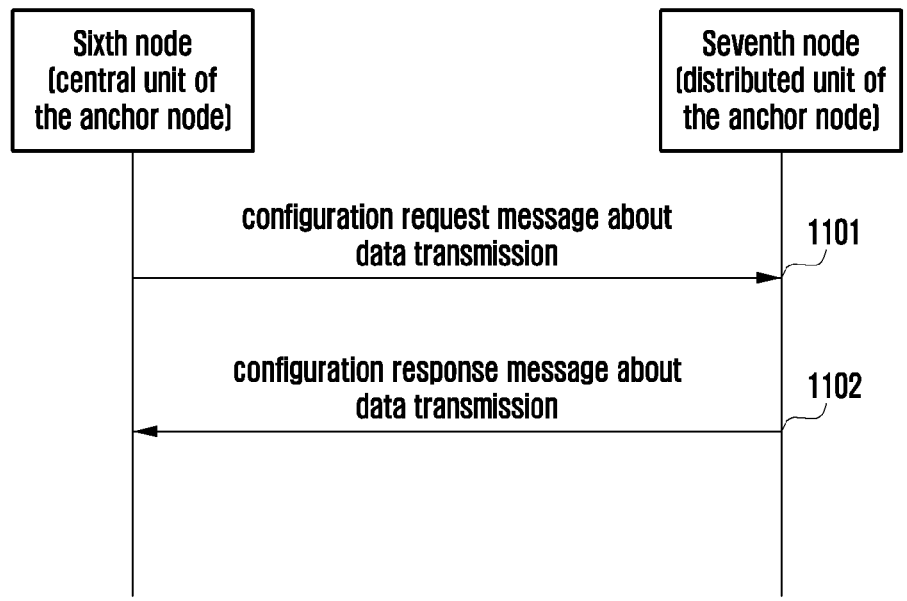
[Fig. 12]
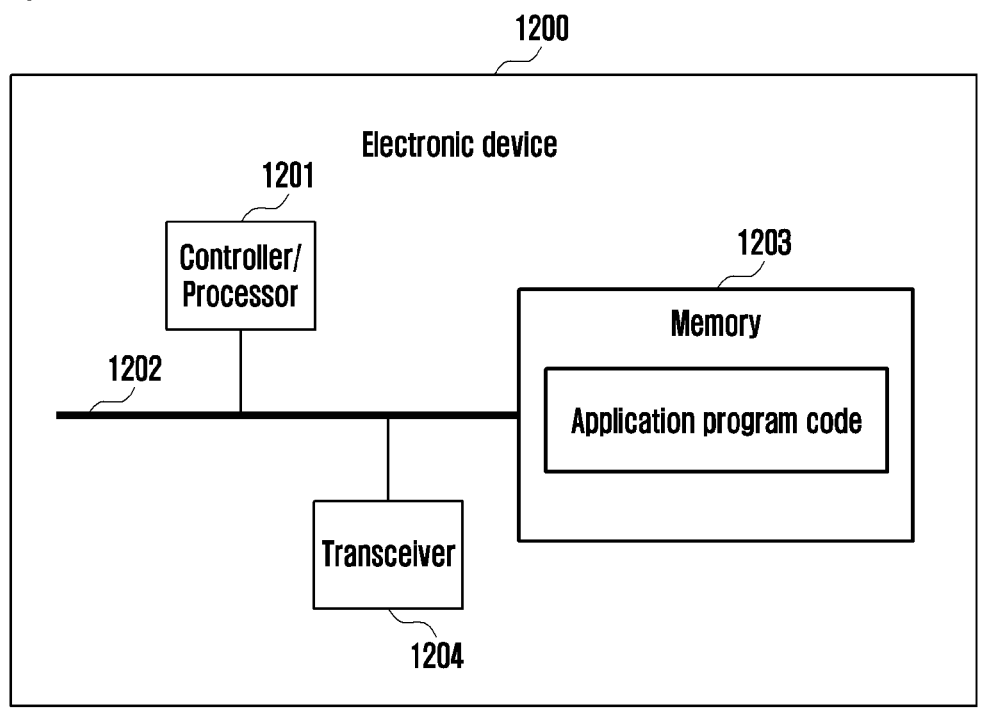

RESOURCE MANAGEMENT METHOD, CONTROL INFORMATION TRANSMISSION METHOD AND INFORMATION CONFIGURATION METHOD

CROSS-REFERENCE TO RELATED APPLICATIONS

This application is a 371 of International Application No. PCT/KR2020/003923 filed on Mar. 23, 2020, which claims priority to Chinese Patent Application No. 201910245816.3 filed on Mar. 28, 2019 and Chinese Patent Application No. 201910741035.3 filed on Aug. 12, 2019, the disclosures of which are herein incorporated by reference in their entirety.

BACKGROUND

1. Field

The present application relates to the field of communication technology, and in particular, the present application relates to a resource management method, a control information transmission method, and an information configuration method.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a research related to the field of a resource management method, a control information transmission method, and an information configuration method has been conducted recently.

The purpose of this application is to be able to solve at least one of the drawbacks of the prior art.

SUMMARY

Embodiments of the present application provide the following solutions:

In a first aspect, an embodiment of the present application provides a resource management method, which is executed by a first node, and the method includes:
  transmitting a backhaul link resource management request to a second node, where the resource management request includes identification information of at least one user referred by the resource management request and information related to the backhaul link resources referred by the resource management request;
  receiving a first request response message returned by the second node based on the resource management request.

In a second aspect, an embodiment of the present application provides a resource management method, which is executed by a second node, and the method includes:
  receiving a backhaul link resource management request transmitted by the first node, where the resource management request includes information related to the backhaul link resources referred by the resource management request;
  transmitting a first request response message to the first node according to the resource management request.

In a third aspect, an embodiment of the present application provides a control information transmission method, which is executed by a fourth node, and the method includes:
  transmitting a data packet to a fifth node, where the data packet includes control information related to user data;
  wherein, the fourth node and the fifth node are nodes in the IAB network.

In a fourth aspect, an embodiment of the present application provides a control information transmission method, which is executed by a fifth node, and the method includes:

receiving a data packet transmitted by a fourth node, the data packet includes control information related to user data;

transmitting the data packet based on the control information;

wherein, the fourth node and the fifth node are nodes in the IAB network.

In a fifth aspect, an embodiment of the present application provides an information configuration method, which is executed by a CU of an anchor node, and the method includes:

transmitting a configuration request message of a retransmission data packet or the final (last)final (last) data packet to a DU of the anchor node;

receiving a configuration response message returned by the DU based on the configuration request message.

In a sixth aspect, an embodiment of the present application provides an information configuration method, which is performed by a DU of an anchor node, and the method includes:

receiving a configuration request message of the retransmission data packet or the final (last) data packet from the CU of the anchor node;

configuring information related to the retransmission data packet or the final (last) data packet according to the configuration request information, and transmitting a configuration response message to the CU of the anchor node.

In a seventh aspect, an embodiment of the present application provides a resource management apparatus, which is deployed in a first node, and the apparatus includes:

a resource management request message transmitting module, configured to transmit a backhaul link resource management request to a second node, where the resource management request includes information related to the backhaul link resources referred by the resource management request;

a request response message receiving module, configured to receive a first request response message returned by the second node based on the resource management request.

In an eighth aspect, an embodiment of the present application provides a resource management apparatus, which is deployed in a second node and includes:

a resource management request message receiving module, configured to receive a backhaul link resource management request transmitted by a first node, where the resource management request includes information related to the backhaul link resources referred by the resource management request;

a request response message transmitting module, configured to request to transmit a first request response message to the first node according to the resource management request.

In a ninth aspect, an embodiment of the present application provides a control information transmission apparatus, which is deployed in a fourth node, and the apparatus includes:

a data packet transmitting module, configured to transmit a data packet to a fifth node, where the data packet includes control information related to user data;

wherein, the fourth node and the fifth node are nodes in the IAB network.

In a tenth aspect, an embodiment of the present application provides a control information transmission apparatus, which is deployed in a fifth node, and the apparatus includes:

a data packet receiving module, configured to receive a data packet transmitted by the fourth node, where the data packet includes control information related to user data;

a data packet transmitting module, configured to transmit the data packet based on the control information;

wherein, the fourth node and the fifth node are nodes in the IAB network.

In an eleventh aspect, an embodiment of the present application provides an information configuration apparatus, which is deployed in an CU of an anchor node, and the apparatus includes:

a configuration request message transmitting module, configured to transmit a configuration request message of a retransmission data packet or the final (last) data packet to the DU of the anchor node;

a configuration response message receiving module, configured to receive a configuration response message returned by the DU based on the configuration request message.

In a twelfth aspect, an embodiment of the present application provides an information configuration apparatus, which is deployed in an DU of an anchor node, and the apparatus includes:

a configuration request message receiving module, configured to receive a configuration request message of a retransmission data packet or the final (last) data packet from the CU of the anchor node;

a configuration response message transmitting module, configured to configure information related to a retransmission data packet or the final (last) data packet according to the configuration request information, and transmit a configuration response message to the CU of the anchor node.

In a thirteenth aspect, an embodiment of the present application provides an information interaction system, which is characterized in that the information interaction system includes at least one of the apparatuses provided in the eighth to twelfth aspects of the embodiments of the present application.

In a fourteenth aspect, an embodiment of the present application provides a communication network system, and the communication network system includes the information interaction system provided in the thirteenth aspect of the embodiment of the present application.

In a fifteenth aspect, an embodiment of the present application provides an electronic device. The electronic device includes a processor and a memory. Wherein, the memory stores machine-readable instructions; and the processor is configured to execute machine-readable instructions to implement the method provided by any of the embodiments of the present application.

In a sixteenth aspect, an embodiment of the present application provides a computer-readable storage medium, which stores a computer program. When the computer program is executed by a processor, the processor implements the method provided by any embodiment of the present application.

The beneficial effects brought by the technical solutions provided in this application are:

it solves the problem of how to manage the user radio bearer and/or backhaul link channel between a CU of an anchor node and a DU of the anchor node, or the CU (or anchor node) of the anchor node and the relay node (or distributed unit of the relay node), and avoids the problem of directly abandoning the service for the user radio bearer since a node cannot meet the requirements of the backhaul link resources;

it solves the problem of how to transmit control information relate to the user data between the DU of the anchor node (or anchor node) and the relay node, and between relay nodes, so that the above control information can be obtained to help nodes to better adjust data scheduling strategies.

BRIEF DESCRIPTION OF THE DRAWINGS

In order to explain the technical solution in the embodiments of the present application more clearly, the drawings need to be used in the description of the embodiments of the present application will be briefly introduced below.

FIG. 1 shows a schematic structural diagram of an IAB network architecture;

FIG. 2 shows a schematic structural diagram of a 5G base station;

FIG. 3 shows a schematic flowchart of a resource management method provided according to an embodiment of the present application;

FIG. 4 shows a schematic diagram of a signaling interaction process provided in an example of the present application;

FIG. 5 shows a schematic diagram of a signaling interaction process provided in another example of the present application;

FIG. 6 shows a schematic diagram of a signaling interaction process provided in still another example of the present application;

FIG. 7 shows a schematic diagram of a signaling interaction process provided in still another example of the present application;

FIG. 8 shows a schematic diagram of a signaling interaction process provided in still another example of the present application;

FIG. 9 shows a schematic flowchart of transmission of control information related to user data in an IAB network provided in an example of the present application;

FIG. 10 shows a schematic flowchart of a control information transmission method provided according to an embodiment of the present application;

FIG. 11 shows a schematic flowchart of an information configuration method provided according to an embodiment of the present application;

FIG. 12 shows a schematic structural diagram of an electronic device provided according to an embodiment of the present application.

DETAILED DESCRIPTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In an NR access (New Radio Access) network or a 5G (5th-Generation) network, in order to extend the coverage of the network, an IAB (Integrated Access and Backhaul) subject is proposed, the main purpose of this subject is to build a multi-hop network architecture. FIG. 1 shows a schematic architecture of a multi-hop network, which shows a network architecture including an anchor node (IAB donor)(110) and two relay nodes (IAB nodes)(120, 130). All users (i.e. user equipment) communicate with the anchor node(110) in the end. Wherein, users N1~Nx communicate with the anchor node(110) through relay node 2(130) and relay node 1(120), and users M1~My communicate with the anchor node(110) through relay node 1(120).

The anchor nodes (donor nodes)(110) can be composed of a central unit (IAB-donor central unit, or IAB-donor-CU)(111) of the anchor node(110) and a distributed unit (IAB-donor distributed unit, or IAB-donor-DU)(112) of the anchor node(110). The interface between the central unit (111) and the distributed unit(112) is the F1 interface (see 3GPP TS38. 473). The protocol stack included in the central unit includes a protocol stack serving control plane and a protocol stack serving user plane. Wherein, the protocol stack serving control plane includes a Radio Resource Control (RRC) protocol layer and a packet data convergence protocol (PDCP) layer. The protocol stack serving user plane includes a service data adaptation protocol (SDAP) layer and a PDCP layer. The protocol stack included in the distributed unit includes the protocol stack serving user plane and the protocol stack serving control plane, both of which include a Radio Link Control (RLC) protocol layer, a Medium Access Control (MAC) protocol layer, and a Physical layer (PHY).

A relay node(120, 130) includes a mobile terminal part (121, 131) and a distributed unit part(122, 132), where the mobile terminal part is used to communicate with a higher-level node of the relay node (for example, the mobile terminal 1(121) is used to communicate with the anchor node(110) or the distributed unit(112) of the anchor node (110), and the mobile terminal 2(131) is used to communicate with the distributed unit 1(122) of the relay node 1(120)), and the distributed unit part is used to communicate with the next-level node of the relay node (for example, the distributed unit 1(122) can be used to communicate with the mobile terminal 2(131) or used to communicate with the users M1~My, and the distributed unit 2(132) is used to communicate with the users N1~Nx). The protocol stack used by the distributed unit part of the relay node when serving the next-level node can be a complete protocol stack, such as a protocol stack including RRC/PDCP/RLC/MAC/PHY used by the service control plane, and SDAP/PDCP/RLC/MAC/PHY used by the service user plane; and it can also be a protocol stack containing some protocol layers, such as a protocol stack including RLC/MAC/PHY, or a protocol stack including partial RLC, MAC, and PHY. The protocol stack used by the mobile terminal part in the relay node when communicating with the higher-level node of the relay node can be a complete protocol stack, such as a protocol stack including RRC/PDCP/RLC/MAC/PHY used for serving the control plane, and SDAP/PDCP/RLC/MAC/PHY protocol stack used for serving the user plane; it can also be a protocol stack containing part of the protocol layer, such as the protocol stack including RLC/MAC/PHY, or the protocol stack including part of RLC, MAC and PHY.

In an LTE (Long Term Evolution)/NR network, user data is transmitted by means of a radio bearer (RB). The radio bearer may be a data radio bearer (DRB) or a Signaling Radio Bearer (SRB). Taking data radio bearer (DRB) as an example, each user's data will be transmitted through one or more DRBs, and each DRB has a corresponding QoS (Quality of Service) parameter.

A new base station architecture is defined in the 5G network, that is, the base station(200) includes a central unit (CU shown in the figure)(210) and a distributed unit (DU shown in the figure)(220), as shown in FIG. 2. In the base station architecture, when configuring a DRB or SRB for a user, one way is that: the central unit(210) transmits a request to establish or modify or release DRB/SRB to the distributed unit(220), and the distributed unit(220) will decide to accept or reject it according to the radio resource status, and inform the central unit(210) of the result. The central unit(210) configures the user according to the result fed back by the distributed unit(220). Another way is that: the distributed unit(220) transmits a request to modify or release the DRB/SRB to the central unit(210). For the release request, the central unit(210) can only accept it. For the modifying request, the distributed unit(220) cannot request to modify the QoS parameters of the DRB/SRB.

In a non-IAB network, that is, the existing network, such as the base station architecture of the above 5G network, one user's DRB/SRB is served by the base station's central unit and distributed unit. The QoS requirements of one use's DRB/SRB are completed by the central unit and the distributed unit of the base station. Therefore, the signaling interaction process performed in the prior art can only be performed between the central unit and the distributed unit of the base station. The IAB network will also follow the above method similar to the existing network. When the user's DRB/SRB is configured, the central unit of the anchor node will perform signaling interaction with the distributed unit of the relay node used to access the user (the signaling interaction can be referred to the signaling interaction process between the central unit and the distributed unit of the base station in the existing network), but in the IAB network, since a user's DRB/SRB may be served by multiple nodes together, in the IAB network architecture as shown in FIG. 1, the DRB/SRB of the user N1 will be served by the central unit and the distributed unit in the relay node 1(120), the relay node(130), and the anchor node(110). At this time, the interaction result between the central unit of the anchor node(110) and the distributed unit of the relay node(120, 130) used to access the user cannot reflect the situation of the entire network. Therefore, the existing signaling interaction process cannot effectively coordinate the services of the user radio bearer (for example, DRB/SRB) in the IAB network, which may cause that the user radio bearer that can be served by the IAB network to be eventually rejected by the anchor node.

In the entire multi-hop network, as in the multi-hop network shown in FIG. 1, the link between the distributed unit 1(122) and the mobile terminal 2(131) will be used to transmit data of users N1 to Nx, and the link between the distributed unit(112) of the anchor node and the mobile terminal 1(121) will be used to transmit data of users M1~My and users N1~Nx. Such link has a common feature, that is, the users served by the link access the network through another distributed unit (does not access the network by the distributed unit at one end of the link), for example, the users served by the link between the distributed unit(112) of the anchor node and the mobile terminal 1(121) access to the network through the distributed unit 1(122) and the distributed unit 2(132), and the link between the distributed unit 1(122) and the mobile terminal 2(131) is used to serve the access to the network through the distributed unit 2(132). In the embodiments of the present application, such link is called a backhaul link.

In the IAB network, the relay node accessed by a user is an accessing relay node (accessing IAB node). As shown in FIG. 1, the relay node 2(130) is an accessing relay node for users N1 to Nx, and the relay node 1(120) is the accessing relay node for users M1 to My. When the user's DRB/SRB is configured, the central unit of the anchor node will perform signaling interaction with the distributed unit of the accessing relay node (this signaling interaction can be referred to the signaling interaction process between the central unit and the distributed unit of the base station in the existing network).

The difference between the IAB network and the single-hop network is that the user's DRB/SRB will be transmitted on the backhaul link. In order to realize the transmission of different DRB/SRB of the same user or the transmission of the different DRB/SRB of different users on the backhaul link, the concept of a backhaul channel is also defined accordingly. Data of DRB/SRB of one user can be transmitted on a backhaul link channel, data of different DRB/SRBs of one user can be transmitted on a backhaul link channel, or data of different DRB/SRB of different users can be transmitted on a backhaul link channel. An example of a backhaul link channel is the backhaul link radio link control protocol layer channel (that is Backhaul RLC channel). The entities serving both ends of this channel are served by RLC/MAC/PHY. Further, it is possible to define a new protocol layer (for example, the adaptation layer). This backhaul link channel also has corresponding QoS parameters. One or more backhaul link channels will be established on the backhaul link to serve the DRB/SRB of the user.

The technicians of this application found through research that at least the following three problems exist in the existing network technology and need to be improved.

1. According to the above description, in an IAB network, the DRB/SRB of one user may be jointly served by multiple nodes (non-IAB networks, that is, in the existing network, the DRB/SRB of one user is served by the central unit and the distributed unit of the base station), in the IAB network architecture as shown in FIG. 1, the DRB/SRB of user N1 will be served by the relay node 1(120), the relay node 2(130) and the central unit(111) and distributed unit(112) in the anchor node(110). In this way, the QoS requirements of the DRB/SRB of one user are jointly satisfied by these nodes. However, the signaling interaction process performed in the prior art (for example, the signaling interaction process between the central unit and the distributed unit of the base station) is only performed between the central unit of the anchor node and the distributed unit of the accessing relay node, and does not consider the situation of other nodes serving the user, therefore, the interaction result between the central unit of the anchor node and the distributed unit of the accessing relay node cannot reflect the situation of the entire network. In other words, the distributed unit of the accessing relay node cannot accept the DRB/SRB of a certain user, it does not mean that the user radio bearer cannot be served by the IAB network. In this way, the existing signaling interaction process cannot effectively coordinate the services of the user radio bearer (for example, DRB/SRB) in the IAB network, which may cause the user radio bearer that can be served by the IAB network to be eventually rejected by the anchor node.

For example, a user's DRB/SRB QoS requirements are jointly met by multiple nodes. Taking a DRB as an example, it is assumed that the delay of the DRB from the central unit of the anchor node to the accessing relay node is 10 ms. Taking the network architecture shown in FIG. 1 as an example, it is assumed that, from the central unit(111) of the anchor node(110) to the accessing relay node(130), the DRB passes through: the central unit(111) of the anchor node(110) →the distributed unit(112) of the anchor node(110)→the relay node 1(120)→the accessing relay node(130). The set delay requirements are: the delay between the central unit of the anchor node and the distributed unit of the anchor node is 2 ms, the delay between the distributed unit of the anchor node and the relay node 1 is 6 ms and the delay between the relay node 1 and the accessing relay node is 2 ms. If the relay node 1(120) and the accessing relay node(130) cannot meet the requirement of 2 ms, this does not mean that the DRB of this user, that is, the UE (user equipment), cannot be served by these nodes, because the delay requirements between each node can be adjusted, such as adjusting the delay between the distributed unit(112) of the anchor node(110) and the relay node 1(120) to 2 ms, the delay between the relay node 1(120) and the accessing relay node(130) is adjusted to 6 ms, so that the delay requirement of the DRB can be met.

2. In the IAB network, the backhaul link channel is a special channel that is different from the concept of DRB/SRB in the prior art. This channel is served by the distributed unit of the anchor node or the relay node. When configuring the backhaul link channel, the distributed unit of the anchor node and the distributed unit of the relay node need to be configured according to the requirements of the backhaul link channel (for example, the QoS requirements). The resources serving this channel are completely controlled by the distributed unit of the anchor node or the distributed unit of the relay node. According to the resource status of these nodes, these nodes can manage the backhaul link channels they serve (for example, establishment, release, modification, etc.). However, such signaling interaction process is not defined in the prior art, so that the distributed unit of the anchor node or the distributed unit of the relay node cannot manage the backhaul link channel.

3. In the prior art, the user data is transmitted by the users, the distributed unit of the base station, and the central unit of the base station. In order to control data transmission well, in addition to transmitting user data between the central unit and the distributed unit of the base station, it also carries some control information, which is defined in TS38.425. However, in the IAB network, these control information will be exchanged between the central unit of the anchor node and the distributed unit of the accessing relay node through other nodes (for example, the distributed unit of the anchor node and other relay nodes), and during the transmission, these other nodes may not be able to obtain these control information, which may result in the inability to control the transmission of the user data based on these control information, which affects the efficiency of transmission of the user data and may also affect the information processing based on user data accordingly.

In order to solve at least one of the above technical problems in the prior art, the embodiments of the present application provide a resource management method, a control information transmission method, and an information configuration method.

The following first briefly describes related technical terms that may be involved in the optional embodiments of the present application.

The user radio bearer involved in the embodiment of the present application may be a DRB, an SRB, or an E-RAB (Evolved Radio Access Bearer), which represents data for one user. The user radio bearer may be one or more different radio bearers belonging to one user, or may be one or more different radio bearers belonging to different users. For the QoS information involved in the embodiments of the present application, the QoS information defines information about at least one of the following QoS parameters:

QoS Priority level;
Packet Delay Budget;
Packet Error Rate;
5QI (5G QoS Identifier) value;
QCI (QoS Class Identifier);
Delay Critical Indication;
Averaging Window;
Maximum data burst volume; and
Allocation and Retention Priority;
GBR (Guaranteed Bit Rate) QoS flow information, such as Maximum Flow Bit Rate Uplink/Downlink, Guaranteed Flow Bit Rate Uplink/Downlink and Maximum Packet Loss Rate Uplink/Downlink;
GBR QoS information, such as E-RAB Maximum Bit Rate Uplink/Downlink, E-RAB guaranteed Bit Rate Uplink/Downlink;
Reflective QoS Attribute.

The above QoS information can be used to describe the QoS information of the user radio bear (for example, it can be used to describe the QoS information of the DRB or the QoS information of the SRB). It can also be used to describe the QoS information of the backhaul link channel. If the user radio bearer (for example, the DRB and/or SRB) or the backhaul link channel also contains multiple QoS flows, it can also be used to describe the QoS information of QoS flows.

The definition of each parameter in the QoS information can be seen in 3GPP TS38. 473 and 3GPP TS23.501.

In addition, it should be noted that, in the embodiment of the present application, the signaling messages exchanged between two nodes may be exchanged through a wired link directly connected between the two nodes, or a wireless link between the two nodes, or may be interacted by forwarding through one or more nodes between two nodes, and the link used when forwarding by one or more nodes may be a wired link or a wireless link.

In order to make the purpose, technical solution, and advantages of the present application clearer, the technical solution of the present application and how the technical solution of the present application solves the above technical problems will be described in detail with specific embodiments in conjunction with the accompanying drawings. The following specific embodiments may be combined with each other, and the same or similar concepts or processes may not be repeated in some embodiments. The embodiments of the present application will be described below with reference to the accompanying drawings.

an aspect of the present application provides a solution capable of implementing the management of the user bearer and the backhaul link channels. The details are provided as follows:

FIG. 3 is a schematic flowchart of a resource management method according to an embodiment of the present application. The method may be executed by a first node. As shown in the figure, the method may include:

Step 301: transmitting a backhaul link resource management request to a second node, wherein the resource management request includes information related to backhaul link resources referred by the resource management request;

Step 302: receiving a first request response message returned by the second node based on the resource management request.

It can be understood that both the first node and the second node are nodes in the IAB network.

Wherein, the backhaul link resources may include at least one of a backhaul link channel and a user radio bearer, and the user radio bearer may be at least one of a user DRB, an SRB, and an E-RAB.

For the information related to the backhaul link resources referred by the resource management request, specifically, if it is referred to the backhaul link channel, that is, the backhaul link resources is the backhaul link channel, the backhaul link channel may be the newly established backhaul link channel requested by the first node, or may also be the existing backhaul link channel requested by the first node to be modified, or the backhaul link channel requested by the first node to be released; if it is referred to the user radio bearer, the user radio bearer may be a radio bearer requested by the first node to be newly established, or may be an existing radio bearer requested by the first node to be modified, or may be a radio bearer requested by the first node to be released.

The resource management method provided in the embodiment of the present application implements signaling interaction between different nodes in an IAB network. The first node and the second node interact based on a backhaul link resource management request and a corresponding request response message, so that different nodes in the IAB network can perform the management of the user radio bearer and/or backhaul link channel, so that the interacted nodes can coordinate with each other to implement backhaul link resources (for example, user radio bearer and backhaul link channel) configuration or adjustment to better meet the requirement of the user radio bearer, and avoid directly abandoning the service of the user radio bearer because one node cannot meet the requirement.

It should be noted that the message name in this embodiment of the present application is only one of the optional examples, but it is not unique. Other message names may also be used, for example, the message name "backhaul link resource management request" is used to identify that it is a message related to backhaul link resources management (such as resource establishment, modification, release, etc.), and its name is not unique.

As an optional, the first node may be a central unit of an anchor node or an anchor node (an anchor node including a central unit and a distributed unit), and the second node may be a distributed unit of an anchor node or a relay node (or a distributed unit part of a relay node).

As another optional, the first node may be a distributed unit of an anchor node or a relay node (or a distributed unit part of the relay node), and the second node may be a central unit of an anchor node or an anchor node (an anchor node including a central unit and a distributed unit).

Specifically, in an optional embodiment of the present application, the first node and the second node include any one of the following:

the first node is an anchor node, and the second node is a relay node or a DU of a relay node;

the first node is a CU of an anchor node, and the second node is a DU of an anchor node, a relay node, or a DU of a relay node;

the first node is a relay node or a DU of a relay node, and the second node is an anchor node or a CU of an anchor node;

the first node is a DU of an anchor node, and the second node is a CU of an anchor node;

Wherein, if the first node is an anchor node or a CU of an anchor node, the resource management request is the first resource configuration request; if the first node is a relay node, or a DU of a relay node, or a DU of an anchor node, the resource management request is the first resource configuration modification request.

It should be noted that the relay node here can be an accessing relay node, or may be a non-accessing relay node, or may be a relay node that is both a non-accessing relay node and an accessing relay node.

It can be understood that, for the user radio bearer, the above resource configuration request corresponds to the user radio bearer configuration request, and the resource configuration modification request corresponds to the user radio bearer configuration modification request. Similarly, for the backhaul link channel, the above resources configuration request corresponds to a backhaul link channel configuration request, and the resource configuration modification request corresponds to a backhaul link channel configuration modification request.

As an example, a flowchart of a resource management method is shown in FIG. 4. In this example, the first node may be an anchor node or a CU of the anchor node. When the first node is an anchor node, the second node may be a DU of a relay node or a relay node. When the first node is a CU of an anchor node, the second node may be a DU of a relay node or a relay node or a DU of an anchor node. As shown in FIG. 4, the resource management method in this example may include steps 401 and 402, as follows:

Step 401: the first node transmits a configuration request message 101 (that is, the backhaul link resource management request in this example) to the second node;

Step 402: the second node transmits a configuration response message 102 (that is, the first request response message in this example) to the first node.

Wherein, the above configuration request message 401 and configuration response message 402 may be the UE Context Setup/Modification Request and UE Context Setup/Modification Response/Failure defined on the F1 interface, or the newly defined IAB node Context Setup/Modification Request and IAB node Context Setup/Modification Response/Failure messages, or can also be other messages.

Based on the resource configuration request, the first node can provide the second node with relevant information (for example, QoS information) of the backhaul link resources (for example, user radio bearer and backhaul link channel) that need to be satisfied. Meanwhile, based on the request response information, the second node can provide the first node with reference information for the information related to the backhaul link resources that can be satisfied by the first node (for example, QoS information) according to its resource status. The reference information can help the first node to adjust the parameters of the information related to the backhaul link resources, can help the first node and other nodes serving the user radio bearer adjust the corresponding backhaul link channel settings, in order to better meet the QoS requirements of the user radio bearer, and avoid the problem of directly abandoning the service for the user radio bearer since a node cannot meet the requirements of the QoS information provided by the first node.

As another example, FIG. 5 shows a schematic flowchart of a resource management method. In this example, the first node may be a relay node, or a DU of a relay node, or a DU of an anchor node, and when the first node is the relay node or the DU of the relay node, the second node may be the anchor node or the CU of the anchor node. When the first node is the DU of the anchor node, the second node may be the CU of the anchor node. As shown in FIG. 5, the resource management method in this example may include steps 501 and 502, as follows:

Step 501: the first node transmits a configuration modification request message 501 (that is, the backhaul link resource management request in this example) to the second node;

Step 502: the second node transmits a configuration modification response message 502 (that is, the first request response message in this example) to the first node.

Similarly, the above configuration modification request message 501 and configuration modification response message 502 may be the UE Context Setup/Modification Required and UE Context Setup/Modification Confirm/Refuse messages defined on the F1 interface, respectively, or may be the newly defined IAB node Context Setup/Modification Required and IAB node Context Setup/Modification Confirm/Refuse messages, or other messages.

Based on the resource configuration modification request, the first node can request to modify the relevant information of the user radio bearer or backhaul link channel (for example, QoS information) according to its own resource status, and adjust the configuration while the first node serves the user radio bearer or backhaul link channel, and the second node can decide whether to accept the modification requested by the first node according to the IAB network status. In addition, when the first node requests the release of the user radio bearer or the backhaul link channel, it provides the second node with the relevant information of the user radio bearer or the backhaul link channel that it can satisfy, which can help the second node to adjust the relevant information of the user radio bearer or backhaul link channel that the second node needs to satisfy according to the network conditions to avoid the problem that the second node directly releases the user radio bearer or backhaul link channel requested by the first node to be released. This can effectively provide services for the user radio bearer, and there is no need to abandon the service for the user radio bearer because one node in the IAB network cannot meet the required QoS information.

In an optional embodiment of the present application, if the resource management request is a first resource configuration request, the information related to the backhaul link resources referred by the resource management request includes at least one of the following information (this is, the backhaul link resources referred by the information related to backhaul link resources can be requested to be newly established, or requested to be modified, or requested to be released):
  identification information of at least one user referred by the resource management request;
  identification information of the backhaul link resources referred by the resource management request;
  information related to the QoS of the backhaul link resources serving the user;

if the resource management request is a first resource configuration modification request, the information related to the backhaul link resources referred by the resource management request includes at least one of the following information (the backhaul link resources referred by the information related to the backhaul link resources can be requested to be newly established, requested to be modified, or requested to be released):
  identification information of at least one user referred by the resource management request;
  identification information of the backhaul link resources referred by the resource management request;
  information related to the QoS of the backhaul link resources requested to be modified.

Wherein, the at least one user may include at least one of the following:
  UE, relay node, relay node other than the first node or the second node.

Wherein, the identification information of at least one user referred by the resource management request, that is, one or more identification information of at least one user referred by the message (that is, the resource management request), the identification information may include, but is not limited to, such as gNB-CU UE F1AP ID ((5G base station central unit user F1AP (F1 Application Protocol) identification), gNB-DU UE F1AP ID (5G base station distributed unit user F1AP identification), C-RNTI (Cell Radio Network Temporary Identifier), etc., the user may be a user without a relay function, such as an ordinary UE, or another relay node.

For the identification information of the backhaul link resources referred by the resource management request, specifically, if the backhaul link resources is a backhaul link channel, the identification information is the identification information of the backhaul link channel, such as the ID of the backhaul link channel. If the backhaul link resources is the user radio bearer, the identification information is the identification information of the user radio bearer, such as the DRB ID, SRB ID or E-RAB ID.

In an optional embodiment of the present application, corresponding to the first resource configuration request, the information related to the QoS of the backhaul link resources serving the user may specifically include at least one of the following information (parameters included in the following QoS information can be referred to the QoS information described above in the present application):
  QoS information of the backhaul link resources;
  The desired or requested QoS information to be satisfied for the backhaul link resources;
  The maximum desired or requested QoS information to be satisfied for the backhaul link resources;
  The minimum desired or requested QoS information to be satisfied for the backhaul link resources;
  feedback indication information indicating information that the second node needs to give a feedback.

Each of the above pieces of information corresponding to the first resource configuration request will be described separately below.

QoS information of backhaul link resources: if it is referring to the backhaul link channel, the QoS information may be generated by the first node according to the setting of the QoS parameters of the data served by the backhaul link channel; if it is referring to the user radio bearer, the QoS information may be generated by the first node according to the setting of the QoS parameters received from the core network. This represents the QoS requirements that the IAB network needs to satisfy when serving the user radio bearer. This requirement needs to be satisfied jointly by the anchor node (or central unit of the anchor node), the accessing relay node, and all the nodes between these two nodes. For details, please refer to the "DRB QoS" IE in TS38.473.

The desired or requested QoS information to be satisfied for the backhaul link resources (for example, the backhaul link channel or user radio bearer): This information is the QoS requirement, which is desired or requested by the first node, to be satisfied by the second node while the second node serves the backhaul link channel or the user radio bearer. The "QoS information of the backhaul link resource which is desired or requested to be satisfied" can be the same as the "QoS information of the backhaul link resources", or can be different from the "QoS information of the backhaul link resources"

The maximum desired or requested QoS information to be satisfied for the backhaul link resource (for example, the backhaul link channel or the user radio bearer): this information is the maximum QoS requirement to be satisfied, which is desired or requested by the first node when the second node serves the backhaul link channel or the user radio bearer, the "the maximum desired or requested QoS information to be satisfied for the backhaul link resources" can be the same as the "QoS information of the backhaul link resources" or "the desired or requested QoS information to be satisfied for the backhaul link resource", or can be different.

The minimum desired or requested QoS information to be satisfied for backhaul link resource (for example, the backhaul link channel or user radio bearer), the information is the minimum QoS requirements to be satisfied, which is desired or requested by the first node when the second node serves the backhaul link channel or user radio bearer, and the "the minimum desired or requested QoS information to be satisfied for the backhaul link resources" can be the same as the "QoS information of the backhaul link resources" or "the desired or requested QoS information to be satisfied for the backhaul link resources", or can be different.

Feedback indication information indicating the information that the second node needs to give a feedback: the indication information indicates the information that the second node needs to give a feedback. In one embodiment, for the backhaul link resources (backhaul link channel or user radio bearer), upon receiving the indication information, the first node gives the feedback according to the indication information. In another embodiment, for the backhaul link resources, if the second node cannot satisfy the above "QoS information of the backhaul link resources", and/or "the desired or requested QoS information to be satisfied for the backhaul link resources", and/or "the maximum desired or requested QoS information to be satisfied for the backhaul link resources", and/or "the minimum desired or requested QoS information to be satisfied for the backhaul link resources", the second node gives a feedback according to the indication information.

In an optional embodiment of the present application, the feedback indication information indicating the information that the second node needs to give a feedback may include at least one of the following information:
  indicating the second node to give a feedback on "the maximum satiable QoS information of the backhaul link resources";
  indicating the second node to give a feedback on "the minimum satiable QoS information of the backhaul link resources";
  indicating the second node to give a feedback on "the satiable QoS information of the backhaul link resources".

It should be noted that, for the word "satiable" involved in the embodiments of the present application, it can be interpreted with "admittable" or "acceptable".

The above "indication information indicating the information that the second node needs to give a feedback (i.e., feedback indication information)" is given for a backhaul link resources (for example, a backhaul link channel or a user radio bearer), that is, the first node selects whether the indication is included in Step 401 for each backhaul link resources. In another embodiment, the feedback indication information may be referred to the user. As long as the indication information is available, the second node needs to give feedback information according to the indication information for each backhaul link resources.

In an optional example of the present application, if the resource management request is a first resource configuration request, the first request response message further includes at least one of the following information:
  identification information of at least one user referred by the first request response message;
  information related to the backhaul link resources accepted by the second node;
  information related to the backhaul link resources not accepted by the second node;
  configuration information of the second node.

Each of the above information in the first request response information corresponding to the first resource configuration request is described below.

Identification information of at least one user referred by the first request response message: that is, one or more identification information of the user referred by the request response message, such as gNB-CU UE F1AP ID, gNB-DU UE F1AP ID, C-RNTI, the user may be a user who does not have a relay function, such as an ordinary UE, or may be another relay node.

The response information related to the backhaul link resources may specifically include one of the following information:
  Information related to the backhaul link resources (for example, the backhaul link channel or user radio bearer) accepted by the second node, if the accepted backhaul link information is a backhaul link resources requested to be newly established in Step 401 (Step 401 in the example shown in FIG. 4), it indicates that the second node has accepted the newly established backhaul link resources. If the accepted backhaul link resources is the backhaul link resources requested to be modified in Step 401, it indicates that the second node has accepted the modified backhaul link resources, if the accepted backhaul link resources is the backhaul link resources requested to be released in Step 401, it indicates that the second node has accepted the request for releasing the backhaul link resources.

Information related to the backhaul link resources not accepted by the second node: if the unaccepted backhaul link resources is the backhaul link resources requested to be newly established in Step 401, it indicates that the second node does not accept the newly established backhaul link resources, if the unaccepted backhaul link resources is the backhaul link resources requested to be modified in Step 401, it indicates that the second node does not accept the modification of the backhaul link resources, if the unaccepted backhaul link resources is the backhaul link resources requested to be released in Step 401, it indicates that the second node does not accept the request for releasing the backhaul link resources.

The configuration information of the second node, that is, the configuration information of the second node side generated by the second node, for example, may include but is not limited to the configuration information of the RLC layer, and/or the configuration information of the logical channel, and/or the configuration information of the MAC layer and/or configuration information of the PHY layer, which may refer to Cell group configuration in TS38.331. The configuration information is related to the backhaul link channel (or user radio bearer) accepted and not accepted by the second node.

In an optional embodiment of the present application, the information related to the backhaul link resources accepted by the second node may include at least one of the following:
  identification information of the backhaul link resources;
  indication information for indicating the QoS information satisfied by the second node;
  QoS information satisfied by the second node;
  information fed back based on feedback indication information included in the first resource configuration request.

Specifically, if the identification information of the backhaul link resources is referring to the backhaul link channel, the identification information may be the ID of the backhaul link channel, or the logical channel ID serving the backhaul link channel, if it is referring to the user radio bearer, the identification information may be a DRB ID or an SRB ID or an E-RAB ID.

Indication information indicating the QoS information (that is, QoS requirements) satisfied by the second node: the indication information is used to indicate that the QoS information that can be satisfied by the second node is "QoS information of the backhaul link resources" and/or "the desired or requested QoS information to be satisfied for the backhaul link resources" and/or "the maximum desired or requested QoS information to be satisfied for the backhaul link resources" and/or "the minimum desired or requested QoS information to be satisfied for the backhaul link resources".

QoS information satisfied by the second node: specifically, such as "QoS information of the backhaul link resources" and/or "the satiable QoS information of the backhaul link resources" and/or "the maximum satiable QoS information of the backhaul link resources" and/or "the minimum satiable QoS information of the backhaul link resources". Further, the information may be fed back according to the feedback indication information included in Step 401. Further, the information may be fed back according to the feedback indication information included in Step 401.

In an optional embodiment of the present application, the information related to the backhaul link resources accepted by the second node may include at least one of the following:
  identification information of the backhaul link resources;
  indication information for indicating QoS information that is not satisfied by the second node;
  QoS information not satisfied by the second node;
  QoS information that can be satisfied by the second node;
  information fed back based on the feedback indication information included in the first resource configuration request;
  cause information that the second node does not accept the backhaul link.

Specifically, for the identification information of the backhaul link resources, if it is referring to the backhaul link channel, it is the ID of the backhaul link channel, or the ID of the logical channel serving the backhaul link channel, and if it is referring to the user radio bearer, the identification information may be a DRB ID or an SRB ID or an E-RAB ID.

For indication information indicating the QoS information that is not satisfied by the second node: the indication information which is used to indicate that the QoS information that is not satisfied by the second node may be "QoS information of backhaul link resources" and/or "the desired or requested QoS information to be satisfied for the backhaul link resources" and/or "the maximum desired or requested QoS information for the backhaul link resources" and/or "the minimum desired or requested QoS information to be satisfied for the backhaul link resources".

QoS information that can be satisfied by the second node: specifically, such as the QoS indicated by "QoS information of the backhaul link resources" and/or "the satiable QoS information of the backhaul link resources" and/or "the maximum satiable QoS information of the backhaul link resources" and/or "the minimum satiable QoS information of backhaul link resources" and/or other QoS information of the backhaul link resources generated by the second node. Further, the information may be fed back according to the feedback indication information included in Step 401.

Cause information that the second node does not accept the backhaul link. This information indicates the specific reason why the second node does not accept the backhaul link, such as the limited resources, the cause information can also be used to indicate one or more QoS parameters of the backhaul link that cannot be satisfied (such as QoS Priority level, Packet Delay Budget, Packet Error Rate, 5QI, QCI, Delay Critical Indication, Maximum data burst volume, Allocation and Retention Priority, GBR QoS flow information (for example, Maximum Flow Bit Rate Uplink/Downlink, Guaranteed Flow Bit Rate Uplink/Downlink, Maximum Packet Loss Rate Uplink/Downlink), GBR QoS information (for example, E-RAB Maximum Bit Rate Uplink/Downlink, E-RAB guaranteed Bit Rate Uplink/Downlink), Reflective QoS Attribute).

In an optional embodiment of the present application, corresponding to the first resource configuration modification request, the above information related to the QoS of the backhaul link resources that is requested to be modified may include at least one of the following (the information referred by the backhaul link resources can be the resource requested to be newly established, modified, or released):
  indication information indicating QoS information of backhaul link resources that cannot be satisfied by the first node;
  QoS information of the backhaul link resources that cannot be satisfied by the first node;
  cause information that the backhaul link that cannot be satisfied by the first node;
  indication information indicating QoS information of backhaul link resources that can be satisfied by the first node;
  QoS information of backhaul link resources that can be satisfied by the first node;
  configuration information of the first node.

Each of the above information corresponding to the first resource setup modification request is described below.

Indication information indicating QoS information of the backhaul link resources that cannot be satisfied by the first node: the indication information is used to indicate that the QoS that cannot be satisfied by the first node can be QoS indicated by "QoS information of backhaul link resources (for example, the backhaul link channel or user radio bearer)" and/or "the desired or requested QoS information to be satisfied for the backhaul link resources" and/or "the maximum desired or requested QoS information to be satisfied for the backhaul link resources" and/or "the minimum desired or requested QoS information to be satisfied for the backhaul link resources". Wherein, the "QoS information of the backhaul link resources (for example, the backhaul link channel or user radio bearer)" and/or "the desired or requested QoS information to be satisfied for the backhaul link resources" and/or "the maximum desired or requested QoS information to be satisfied for the backhaul link resources" and/or "the minimum desired or requested QoS information to be satisfied for the backhaul link resources" may be transmitted by the second node to the first node before Step 401 (corresponding to Step S501 in FIG. 5).

QoS information of the backhaul link resources that cannot be satisfied by the first node: Specifically, the QoS information that cannot be satisfied may be, for example, QoS indicated by "QoS information of backhaul link resources" and/or "the desired or requested QoS information of the backhaul link resources" and/or "the maximum desired or requested QoS information to be satisfied for the backhaul link resources" and/or "the minimum desired or requested QoS information to be satisfied for the backhaul link resources" and/or other QoS information of the backhaul link resources generated by the first node.

Cause information that the backhaul link cannot be satisfied by the first node, the information indicates the specific reason why the backhaul link cannot be satisfied by the first node, such as the limited resources, the cause information can also be used to indicate one or more QoS parameters of the backhaul link that cannot be satisfied (such as QoS Priority level, Packet Delay Budget, Packet Error Rate, 5QI, QCI, Delay Critical Indication, Maximum data burst volume, Allocation and Retention Priority, GBR QoS flow information (for example, Maximum Flow Bit Rate Uplink/Downlink, Guaranteed Flow Bit Rate Uplink/Downlink, Maximum Packet Loss Rate Uplink/Downlink), GBR QoS information (for example, E-RAB Maximum Bit Rate Uplink/Downlink, E-RAB guaranteed Bit Rate Uplink/Downlink), Reflective QoS Attribute).

Indication information indicating the QoS information of the backhaul link resources that can be satisfied by the first node: the indication information is used to indicate that the QoS that can be satisfied by the first node is QoS indicated by "QoS information of the backhaul link resources" and/or "the desired or requested QoS information of the backhaul link resources" and/or "the maximum desired or requested QoS information to be satisfied for the backhaul link resources" and/or "the minimum desired or requested QoS information to be satisfied for the backhaul link resources", wherein, the "QoS information of the backhaul link resources" and/or "the desired or requested QoS information to be satisfied for the backhaul link resources" and/or "the maximum desired or requested QoS information to be satisfied for the backhaul link resources" and/or "the minimum desired or requested QoS information to be satisfied for the backhaul link resources" here may be transmitted by the second node to the first node before Step 401.

QoS information of the backhaul link resources that can be satisfied by the first node, for example, the QoS indicated by "QoS information of backhaul link resources" and/or "the satiable QoS information of the backhaul link resources" and/or "the maximum satiable QoS information of the backhaul link resources" and/or "the minimum satiable QoS information of the backhaul link resources" and/or other QoS information of the backhaul link resources generated by the first node. Further, the information can be fed back according to the feedback indication information from the second node received before Step 401. In one embodiment, by containing this information, it can implicitly indicate that the first node cannot satisfy the QoS information which the second node requests the first node to satisfy in other signaling interaction process (this process is performed before Step 401).

Configuration information of the first node: Generated configuration information of the first node side, such as configuration information of the RLC layer, and/or configuration information of the logical channel, and/or configuration information of the MAC layer, and/or configuration information of the PHY layer. For details, please refer to Cell group configuration in TS38.331. In one embodiment, the configuration information may be generated according to a backhaul link channel (for example, the backhaul link channel or a user radio bearer) requested to be modified (or released or established) by the first node. In another embodiment, the configuration information may also be configuration information of the first node side generated based on the "QoS information of the backhaul link resources that can be satisfied by the first node" of the above backhaul link information. In yet another embodiment, the first node may provide one or more of the above configuration information to the second node. For each configuration information, the first node indicates the referred one or more backhaul link resources and corresponding QoS information.

In an optional embodiment of the present application, if the resource management request is a first resource configuration modification request, the first request response message further includes at least one of the following:

identification information of at least one user referred by the first request response message;
information related to the backhaul link resources that the second node agrees to modify;
information related to the backhaul link resources that the second node disagrees to modify;
RRC message which is necessary for the first node to configure the user, such as an RRC Reconfiguration message;
indication information indicating the first node to use the configuration information of the first node when configuring the user.

Each of the information that may be contained in the first request response message (that is, the setup modification response message) corresponding to the first resource configuration modification request is described below.

Identification information of at least one user referred by the first request response message: that is, one or more identification information of the user referred by the message, such as gNB-CU UE F1AP ID, gNB-DU UE F1AP ID, C-RNTI, where the user may be a user without a relay function, such as a common UE, or may be another relay node.

Indication information indicating the configuration information of the first node when the first node configures the user: such as configuration information of the RLC layer, and/or configuration information of the logical channel, and/or configuration information of the MAC layer, and/or configuration information of the PHY layer. For details, please refer to Cell group configuration in TS38.331. If in Step 401 (for example, Step 501 in FIG. 5), the first node provides multiple configuration information to the second node, the indication information may indicate which configuration information is used by the first node when configuring the user.

In an optional embodiment of the present application, the information related to the backhaul link resources that the second node agrees to modify includes (the "agree to modify" means: if the first node requests to newly establish, the second node agrees to newly establish; if the first node requests to modify, the second node agrees to modify; if the first node requests release, the second node agrees to release):

identification information of the backhaul link resources that the second node agrees to modify, in one embodiment, if it is the identification information of the backhaul link resources (the backhaul link channel or user radio bearer) that the second node agrees to modify, the backhaul link resources indicated by the identification information of the backhaul link resources contained in the information will be newly established or be modified or be released. In another embodiment, if the identification information of the backhaul link resources requested to be newly established or be modified or be released in Step 401 (the step 501 in FIG. 5) is not contained in the response information (the message 502 in FIG. 5), then it may also indicate that the second node agrees to newly establish, or modify, or release the backhaul link resources that is not contained in the response message. If it agrees to newly establish, or modify, or release, it indicates that the second node agrees to modify according to the information provided in the first resource configuration modification request (for example, the message 501 in FIG. 5).

In an optional embodiment of the present application, the information related to the backhaul link resources that the second node does not agree to modify includes at least one of the following (the "disagree to modify" means: if the first node requests to newly establish, the second node does not agree to newly establish; if the first node requests to modify, the second node does not agree to modify; if the first node requests release, the second node does not agree to release):

identification information of the backhaul link resources that the second does not agree to modify;
QoS information of the backhaul link resources needs to be satisfied by the first node;
indication information for indicating configuration information of the backhaul link resources needs to be used by the first node.

In one embodiment, in the above process, if the first node transmits a first resource configuration modification request message to the second node, the message includes information of the backhaul link resources requested to be released, and regarding to the backhaul link resources requested to be released, the first node provides the information related to the satiable QoS of the backhaul link resources. If the release request of the first node is rejected in the first request response message fed back by the second node, it indicates that the first node can allocate the resources for the backhaul link resources according to "the satiable QoS of the backhaul link resources" it provides. If the release request of the first node is rejected in the first request response message fed back by the second node and "QoS information of the backhaul link resources needs to be satisfied" is provided, it indicates that the first node can allocate resources for the backhaul link resources according to "QoS of the backhaul link resources needs to be satisfied" it provides.

In one embodiment, in the above process, if the first node transmits a first resource configuration modification request message to the second node, the message includes information of the backhaul link resources requested to be modified, and regarding to the backhaul link resources requested to be modified, the first node provides the information related to the QoS of the backhaul link resources that can be satisfied, and the second node rejects the modification request of the first node when the second node returns the first request response message and provides "QoS information of the backhaul link resources that needs to be satisfied" while returning the first request response message, it indicates that the first node allocates resources for the backhaul link resources according to "QoS information of the backhaul link resources needs to be satisfied".

For identification information of the backhaul link resources that the second node disagrees to modify, similarly, if it is referring to the backhaul link channel, the identification information is the ID of the backhaul link channel, or the ID of the logic Channel that serves the backhaul link channel. If it is referring to the user radio bearer, the identification information can be a DRB ID, an SRB ID or an E-RAB ID.

indication information for indicating configuration information of the backhaul link resources needs to be used by the first node: the configuration information may include, but is not limited to, configuration information of the RLC layer, and/or configuration information of the logical channel, and/or configuration information of the MAC layer, and/or the configuration information of the PHY layer, etc., for details, refer to the indication information of the Cell group configuration in TS38.331. As shown in Step 501 in FIG. 5, if the first node provides the second node with multiple configuration information serving the backhaul link resources, such as configuration information generated for "QoS information of the backhaul link resources", and/or configuration information generated for "the satiable QoS information of the backhaul link resources" and/or configuration information generated for "the maximum satiable QoS information of the backhaul link resources", and/or configuration information generated for "the minimum satiable QoS information of the backhaul link resources", and/or, other configuration information generated for the QoS information of the backhaul link resources generated by the first node, the indication information may be used to indicate which of the above configuration information should be used by the first node.

In an optional embodiment of the present application, if the resource management request is a first resource configuration request, receiving the first request response message returned by the second node based on the resource management request includes:

receiving a second resource modification request transmitted by the second node based on the first resource configuration request;
transmitting a second request response message to the second node based on the second resource modification request;
receiving a first request response message returned by the second node based on the second request response message and the first resource configuration request.

In an optional embodiment of the present application, if the resource management request is a first resource configuration modification request, receiving a first request response message returned by the second node based on the resource management request includes:

receiving a second resource configuration request transmitted by the second node based on the first resource configuration modification request;

returning a third request response message to the second node based on the second resource configuration request;

receiving a first request response message returned by the second node based on the third request response message and the first resource configuration modification request.

In an actual system, the above two interaction processes provided in the above embodiments of this application (the interaction process in which the first node initiates resource configuration request information to the second node (for ease of description, this process is referred to as a first process, as the process shown in FIG. 4) and the process in which the first node initiates a resource configuration modification request to the second node (for ease of description, this process is referred to as a second process, as the process shown in FIG. 5) can be used together.

As an example, FIG. 6 shows a schematic flowchart of a resource allocation method used by two interaction process configurations. As shown in the figure, in this example, the first process can be performed between the second processes. Specifically, the resource allocation method may mainly include:

Step 601: the first node transmits a configuration modification request message 601 (for example, a first resource configuration modification request) to the second node, and the request can be specifically referred to the first resource configuration modification request (for example, the message 501 in FIG. 5);

Step 602: the second node transmits a resource configuration request message 602 to the first node, which can be referred to the first resource configuration request (the message 101 shown in FIG. 4);

Step 603: the first node transmits a configuration response message 603 to the second node, which can be referred to the response message corresponding to the first resource configuration request message (for example, the message 402 shown in FIG. 4);

Step 604: the second node transmits a configuration modification response message 604 to the first node, which can be referred to the first resource configuration modification response (the message 502 shown in FIG. 5).

As an example, FIG. 7 shows a schematic flowchart of another resource allocation method used by two interaction process configurations. As shown in the figure, in this example, the second process can be performed in the first processes. Specifically, the resource allocation method may mainly include:

Step 701: the first node transmits a configuration request message 701 to the second node, which can be referred to the message 401 shown in FIG. 4 described above.

Step 702: the second node transmits a configuration modification request message 702 to the first node, which can be referred to the message 501 shown in FIG. 5 described above.

Step 703: the first node transmits a configuration modification response message 703 to the second node, which can be referred to the message 502 shown in FIG. 5 described above.

Step 704: the second node transmits a configuration response message 704 to the first node, which can be referred to the message 402 shown in FIG. 4 described above.

In an optional embodiment of the present application, if the first node communicates with the second node through at least one third node, and the resource management request is a first resource configuration modification request, the first request response message is determined by the second node in the following manner of:

transmitting a third resource configuration request to at least one third node based on the first resource configuration modification request;

receiving a fourth request response message returned by the third node based on the third resource configuration request;

determining the first request response message according to the fourth request response information and the first resource configuration modification request.

In the IAB network, the user radio bearer is jointly served by multiple nodes. Therefore, when coordinating backhaul link resources such as the backhaul link channel or the user radio bearer, one or more other nodes (for example, the third node, etc., the other node may be another relay node, or the distributed unit of the anchor node) may be involved. The following description uses the other node as the third node as an example. For the case where there are multiple other nodes, the same can be deduced.

As an example, FIG. 8 shows a schematic flowchart of a resource management method when a first node interacts with a second node through a third node. As shown in the figure, the method may include:

Step 801: the first node transmits a configuration modification request message 801 to the second node, which can be referred to the message 501 shown in FIG. 5 described above.

Step 802: the second node transmits a configuration request message 802 to the third node, which can be referred to the message 401 shown in FIG. 4;

Step 803: the third node transmits a configuration response message 803 to the second node, which can be referred to the message 402 shown in FIG. 4;

Step 804: the second node transmits a configuration modification response message 804 to the first node, which can be referred to the message 502 shown in FIG. 5 described above.

In this example, the above steps 802 and 803 are used for the second node and other nodes (for example, the third node) to adjust the configuration to serve the user radio bearer. The adjustment is based on the information received in Step 801. For example, if the QoS information of the backhaul link channel or the user radio bearer that can be satisfied by the first node is provided in Step 801, the QoS information to be satisfied while the third node serves the user radio bearer is adjusted according to the information in steps 802 and 803 so as to better provide users with radio bearer services.

It should be noted that, for the resource management method shown in FIG. 6, FIG. 7 or FIG. 8, in each interaction process, in addition to the first step of the trigger node (the first node in the example) that triggers the start of the process, the current step of each node is performed based on the message received by the node, for example Step 602 in FIG. 6 in which the second node transmits the message 602 to the first node, and this step is performed based on the message 601 received by the second node. In other words, the information carried in the message 602 is determined by the second node according to the message 601 received by the second node and the current resource configuration information of the second node.

Based on the resource configuration method provided in the embodiment of the present application, between the nodes in the IAB network, that is, between the first node and the second node, the resource management of the user radio bearer or the backhaul ink channel resource serving the user radio bearer can be performed, for example, the configuration, the resource allocation and modification of the user radio bearer and/or backhaul link channel, etc. This method can effectively coordinate the resource allocation of each node in the IAB network and ensure that services are provided for the user radio bearer.

In the prior art, when the CU and DU of the base station transmit user data, the CU transmits control information related to the user data to the DU, such as for indicating whether the transmitted user data is a retransmitted data (refer to Retransmission Flag field contained in the DL USER DATA (downlink user data) in TS38. 425), and the DU will also transmit some control information related to the user data to the CU, such as for indicating that the data packet transmitted by the DU to the CU is the final (last) data packet used for reporting the downlink status (for example, the Final Frame Indication field contained in the DL DATA DELIVERY STATUS in TS38. 425), such as the information for indicating the desired data rate of one user radio bearer (for example, the Desired Data Rate field contained in DL DATA DELIVERY STATUS in TS38. 425), this information indicates the data rate desired by the DU when the CU transmits the data of the user radio bearer, and the control information may also be used to indicate information of the status of link of the DU servicing user (for example, the Cause field contained in the DL DATA DELIVERY STATUS in TS38. 425).

If the existing network is used, in the IAB network, for a user radio bearer (for example, DRB/SRB/E-RAB), the control information is interacted between the CU of the anchor node and the accessing relay node of the user (that is, not between intermediate nodes). During the interaction, these information will be forwarded through one or more intermediate nodes (for example, the distributed unit of the anchor node and other relay nodes) between the CU of the anchor node and the accessing relay node of the user, as shown in FIG. 9, the control information will be forwarded by the distributed unit(912) of the anchor node and relay node 1(920). During the forwarding process, the control information may be invisible to these intermediate nodes (the distributed unit(912) of the anchor node and the relay nodes 1(920) shown in FIG. 9), but these control information can help these intermediate nodes to forward the data. In order to solve this problem, another aspect of the embodiments of the present application provides a method for transmitting control information related to user data in the IAB network. The details are provided as follows:

An embodiment of the present application provides a control information transmission method, which may be executed by a fourth node. As shown in FIG. 10, the method may mainly include:

Step 1001: transmitting a data packet (a data packet containing control information related to user data as shown in the figure) to the fifth node, and the data packet includes control information related to user data;
wherein, the fourth node and the fifth node are nodes in the TAB network.

In an optional embodiment of the present application, the fourth node and the fifth node may be any two nodes that communicate (directly or indirectly) in the TAB network, and may specifically be, but not limited to, intermediate nodes in the TAB network. It can be understood that the intermediate node refers to neither the CU of the anchor node in the TAB network, nor the node accessing the relay node.

In an optional embodiment of the present application, the fourth node and the fifth node include any one of the following:
the fourth node and the fifth node are relay nodes in the TAB network;
one of the fourth node and the fifth node is a distributed unit of the anchor node in the TAB network, and the other is a relay node in the TAB network.

In an optional embodiment of the present application, the data packet may include at least one of the following information:
user data;
indication information of identification information of the user to which the data packet belongs;
indication information of identification information of a user radio bearer to which the data packet belongs;
indication information of identification information of a backhaul link channel to which the data packet belongs;
indication information of path identification information of a path to which the data packet belongs;
destination receiving node to which the data packet belongs;
source transmitting node to which the data packet belongs;
indication information of identification information of a relay node accessed by the user to which the data packet belongs;
indication information of data packet type;
indication information of the data rate used when the fourth node desires the fifth node to transmit data to the four data;
indication information related to a channel status when a distributed unit of the fourth node transmits and receives data.

In an optional embodiment of the present application, the indication information of the data packet type includes at least one of indication information used to indicate that the data packet is a retransmission data packet and indication information used to indicate that the data packet is the final (last) data packet.

Each information that can be included in the above data packet is described separately below.

User data: such as PDCP PDUs carrying user data;

The indication information of the identification information of the user to which the data packet belongs: the indication information may be explicit or implicit, and specifically may explicitly or implicitly include the identification information of the user to which the data packet belongs.

The indication information of identification information of a user radio bearer to which the data packet belongs: similarly, the indication information may be implicit, and specifically may explicitly or implicitly include identification information of the user radio bearer to which the data packet belongs.

The indication information of the identification information of the backhaul link channel to which the data packet belongs: the indication information may be explicit or implicit, and, specifically, it may explicitly or implicitly include the identification information of the backhaul link channel to which the data packet belongs.

The indication information of the path identification information of the path to which the data packet belongs: the indication information may be explicit or implicit, and, specifically, it may explicitly or implicitly include the path identification information of the path to which the data packet belongs. In one embodiment, the path indicated by the path identification information represents one or more nodes through which the user data is transmitted from the CU of the anchor node to the accessing relay node of the user. In another embodiment, the path indicated by the path identification information represents one or more nodes through which the user data is transmitted from the accessing relay node of the user to the CU of the anchor node.

The indication information of the identification information of the destination receiving node to which the data packet belongs, or the indication information of identification information of a source transmitting node to which the data packet belongs, or the indication information of the identification information of the relay node accessed by the user to which the data packet belongs: similarly, one or more of these indication information may be explicit or implicit, and, specifically, it may explicitly or implicitly include the identification information (for example, the ID of the relay node/anchor node/central unit of the anchor node/distributed unit of the anchor node, the identification information of the mobile terminal part of the relay node, and the identification information of the distributed unit part of the relay node, the address information of the relay node/anchor node/the central unit of the anchor node/the distributed unit of the anchor node (for example, the IP address information, the newly defined address information, where the newly defined address information may be allocated by the central unit of the anchor node)) of the destination receiving node (or the source transmitting node, or the relay node accessed by the user) to which the data packet belongs.

Indication information of data packet type: at least one of indication information of retransmission data packet and indication information of the final (last) data packet.

The retransmission indication information is the indication information of retransmission data packet, which indicates that the data packet is a retransmission data packet.

The indication information of the final (last) data packet: this information indicates that this data packet is the final (last) data packet (or the final (last) data packet containing a DL DATA DELIVERY STATUS, or the final (last) data packet containing an uplink status report). In an embodiment, the indication information indicates that the data packet is the final (last) data packet transmitted by the fourth node to the fifth node (or the final (last) data packet containing a downlink status report, or the final (last) data packet containing an uplink status report).

In an embodiment, the indication information of the final (last) data packet may be combined with the above "indication information of identification information of the user to which the data packet belongs" to indicate that the data packet is the final (last) data packet belonging to the user identified by the identification information and being transmitted by the fourth node to the fifth node (or the final (last) data packet containing a downlink status report, or the final (last) data packet containing an uplink status report).

In another embodiment, the indication information of the final (last) data packet may be combined with the above "indication information of identification information of a user radio bearer to which the data packet belongs" to indicate that the data packet is the final (last) data packet belonging to the user radio bearer identified by the identification information and being transmitted by the fourth node to the fifth node (or the final (last) data packet containing a downlink status report, or the final (last) packet containing an uplink status report).

In still another embodiment, the indication information of the final (last) data packet may be combined with the above "indication information of the identification information of the backhaul link channel to which the data packet belongs" to indicate that the data packet is the final (last) data packet belonging to the backhaul link channel identified by the identified information and being transmitted by the fourth node to the fifth node (or the final (last) data packet containing a downlink status report, or the final (last) data packet containing an uplink status report).

In another embodiment, the indication information of the final (last) data packet may be combined with the above "identification information of a path to which the data packet belongs" to indicate that the data packet is the final (last) data packet belonging to the path identified by the identification information and being transmitted by the fourth node to the fifth node (or the final (last) data packet containing the downlink status report, or the final (last) data packet containing the uplink status report).

In another embodiment, the indication information of the final (last) data packet may be combined with the above "identification information of a destination receiving node (or a source transmitting node or a relay node accessed by the user) to which the data packet belongs" to indicate that the data packet is the final (last) data packet belonging to the node identified by the identification information and being transmitted by the fourth node to the fifth node (or the final (last) data packet containing a downlink status report, or the final (last) data packet containing an uplink status report).

indication information of the data rate used when the fourth node desires the fifth node to transmit data to the four data: that is, the indication information used to indicate the data rate desired by the fourth node when the fifth node transmits data to the fourth node, the indication information indicates a desired data transmission rate. In one embodiment, the indication information indicates the desired data rate used by the fifth node when the fifth node transmits data to the fourth node.

In one embodiment, the indication information of the used data rate may be combined with the above "identification information of the user to which the data packet belongs" to indicate the data rate the fourth node desires the fifth node to use when the fifth node transmits data belonging to the user identified by the identification information to the fifth node.

In an embodiment, the indication information of the used data rate may be combined with the above "identification information of the user radio bearer to which the data packet belongs" to indicate the data rate the fourth node desires the fifth node to use when the fifth node transmits the data belonging to the user radio bearer identified by the identification information to the fourth node.

In an embodiment, the indication information of the used data rate may be combined with the above "identification information of the backhaul link channel to which the data packet belongs" to indicate the data rate the fourth node desires the fifth node to use when the fifth node transmits the data belonging to the backhaul link channel identified by the identification information to the fourth node.

In one embodiment, the indication information of the used data rate may be combined with the above "identification information of a path to which the data packet belongs" to indicate the data rate the fourth node desires the fifth node to use when the fifth node transmits the data belonging to the path identified by the identification information to the fourth node; in one embodiment, the indication information may be combined with the above "the identification information of the destination receiving node to which the data packet belongs (or the source transmitting node, or the relay node accessed by the user) to indicate the data rate the fourth node desires the fifth node to use when the fifth node transmits data belonging to the node identified by the identification information to the fourth node.

The indication information related to the channel status when the distributed unit of the fourth node transmits and receives data: that is, the information used to indicate the information related to the channel status when the distributed unit of the fourth node transmits and receives data, such as indication information of the radio link outage/resume), and/or indication information of uplink or downlink radio link outage/resume, etc.

In one embodiment, the indication information related to the channel status may be combined with the above "identification information of the user to which the data packet belongs" to indicate the user referred by the status information; in one embodiment, the indication information related to the channel status may be combined with the above "identification information of the user radio bearer to which the data packet belongs" to indicate the user radio bearer referred by the status information; in one embodiment, the indication information related to the channel status may be combined with the above "the identification information of the backhaul link channel to which the packet belongs" to indicate the backhaul link channel referred by the status information; in one embodiment, the indication information related to the channel status may be combined with the above "identification information of the path to which the data packet belongs" to indicate the path referred by the status information; in one embodiment, the indication information related to the channel status may be combined with the above "the destination receiving node to which the data packet belongs (or the source transmitting node, or the relay node accessed by the user) to indicate the node referred by the status information.

In practical applications, the location of the above control information in the above data packet may be pre-defined according to actual requirements configuration or setting or protocol. As an alternative, the above control information may be contained in the header of the RLC layer of the data packet, or may be contained in the header of the newly defined protocol layer (for example, the adaptation layer, the bearer mapping layer, or other names) above the RLC layer. It may also be contained in the header of the MAC layer, or it may be a signal of a physical layer. In addition, the above control information may be contained in a data packet containing user data, or may be contained in a data packet without user data (for example, an EndMarker packet, which does not contain user data and is dedicatedly used to transmit the above control information).

In the embodiment of the present application, the data packet may be an uplink data packet or a downlink data packet. Wherein, the downlink data packet represents a data packet transmitted by the CU of the anchor node to the accessing relay node of the user, and the uplink data packet represents the data packet transmitted by the accessing relay node of the user to the CU of the anchor node. The data packet containing control information related to user data transmitted by the fourth node to the fifth node may be an uplink data packet (the user data contained in the data packet is ultimately transmitted to the CU of the anchor node), or it may be a downlink data packet (the user data contained in the data packet is ultimately transmitted to the accessing relay node of the user, and then the accessing relay node may transmit it to the user). Further, the data referred by the above data packet may be data served by the distributed unit part of the fourth node, or may be data served by the mobile terminal part of the fourth node, or may be the data served by the distributed unit part of the fourth node and the mobile terminal part.

Wherein, for the above control information that may be contained in the data packet, the fourth node may learn the above information from other nodes, or the fourth node may determine the above information by itself.

When the fourth node is a relay node or a distributed unit of the anchor node, and the fifth node is a central unit of the anchor node, the above control information may also be transmitted to the fifth node through a control signaling (for example, the control signaling of an F1 interface). Specifically, in addition to the above control information, optionally, the control signaling transmitted by the fourth node to the fifth node may further include at least one of information related to data type and indication information without data. Specifically:

Information related to data type includes at least one of the following:
  indication information of the identification information of the user to which it belongs;
  indication information of the identification information of the user radio bearer to which it belongs;
  indication information of the identification information of the backhaul link channel to which it belongs;
  indication information of the identification information of the path to which it belongs;
  destination receiving node to which it belongs;
  source transmitting node to which it belongs;
  indication information of the identification information of the relay node accessed by the user to which it belongs;
  indication information of no data, the indication information is used to indicate that there is no data transmitted from the fourth node to the fifth node. Further, the data may be a specific type of data, and the type of data referred by the indication information may be the above data type indicated by "information related to data type", the indication information may be a separate information element in the control signaling or an information element combined with the above "information related to data type", or it can be contained in the control signaling as a cause information. Further, the data referred by the indication information can be data served by the distributed unit part of the fourth node, or it can be data served by the mobile terminal part of the fourth node, or may the data served by the distributed unit part of the fourth node and the mobile terminal part.

In addition, the above "information related to data type" may be combined with "indication information of no data" to indicate that there is no data indicated by "information related to data type", or indicate that the fourth node does not have data indicated by "information related to data type", or indicate that the fourth node does not have data indicated by the "information related to data type" for transmission.

The above control signaling may be an existing UE Context Modification Required message or a UE Context Release Request message, or other F1 signaling, or a newly defined control signaling.

Before the fourth node transmits control signaling to the fifth node, the fourth node may also receive user data packets containing control information from other nodes. The control information includes at least one of the following information:
  indication information of identification information of the user to which the data packet belongs;

indication information of identification information of a user radio bearer to which the data packet belongs;

indication information of identification information of a backhaul link channel to which the data packet belongs;

indication information of identification information of a path to which the data packet belongs;

destination receiving node to which the data packet belongs;

source transmitting node to which the data packet belongs;

indication information of identification information of a relay node accessed by the user to which the data packet belongs;

indication information of data packet type;

indication information of a data rate used when the other node desires the fourth node to transmit data to the other node;

indication information related to a channel status when a distributed unit of the fourth node transmits and receives data.

Based on the control information transmission method provided in the embodiment of the present application, the fifth node can adjust the packet scheduling decision after learning the above control information transmitted by the fourth node, for example, when learning that the data packet is a retransmission data packet, the fifth node can prioritize the scheduling of the retransmission data packet. When learning that the data packet is the final (last) data packet or learning that there is no data of a certain type on the node, the fifth node can release related resources (for example, releasing or modifying the backhaul link channel serving this data type, release or modify the DRB or SRB serving this type of data), and for example, after learning the link status of the DU of the fourth node when serving the user, the fifth node can decide whether to stop transmitting data to the fourth node, if the link status corresponding to the fourth node is "outage", the fifth node may decide to stop transmitting data to the fourth node. If the link status corresponding to the fourth node is "normal" or "resume", the fifth node may transmit data to the fourth node.

By using the control information transmission method provided in the embodiment of the present application, the relay node can also obtain control information related to the user data when transmitting the user data, which can help the relay node to adjust its data transmission strategy for utilizing the resource more effectively.

For the above data packet (which can be an uplink data packet or a downlink data packet) containing control information, the indication information indicating that the data packet is a retransmission data packet (or the final (last) data packet) is retransmission indication information (or final (last) packet indication), it may be transmitted from the CU of the anchor node, for example, the information is transmitted by the CU of the anchor node to the DU of the anchor node, and then the information is transmitted from the DU of the anchor node to the fourth node, or the information is transmitted from the CU of the anchor node to the DU of the anchor node, and then is transmitted by the DU of the anchor node to the other relay node, and then the information is transmitted by the other relay node to the fourth node. In order to complete the transmission of the above retransmission data packet indication information (or the indication information of the final (last) packet), the existing mechanism may not be able to ensure that the node transmitting the data packet to the fourth node can learn whether a data packet is a retransmission data packet (or whether it is the final (last) data packet), for example, for a downlink data packet which is first transmitted by the CU of the anchor node to the DU of the anchor node and then is transmitted by the DU of the anchor node to the fourth node, it cannot ensure that the DU of the anchor node can learn whether one data packet is a retransmission data packet, such that it is necessary to achieve the above through the configuration information between the CU of the anchor node and the DU of the anchor node; for another example, the data packet transmitted by the fourth node to the distributed unit of the anchor node is the final (last) data packet. However, the current mechanism cannot ensure that the central unit of the anchor node can learn that the data packet transmitted by the distributed unit of the anchor node is the final (last) data packet, which also needs to be achieved by the configuration information between the CU of the anchor node and the DU of the anchor node. The specific configuration method may include, but is not limited to, at least one of the following methods:

Method 1: configuring a special GTP-U tunnel (GPRS Tunnel Protocol User) to indicate that the data packet transmitted in the tunnel is a retransmission data packet (or the final (last) data packet). In this method, the GTP-U tunnel information of the transmitting side and/or the receiving side, such as the GTP-U tunnel identification (GTP-U TEID), and/or the IP address, is used to indicate whether the GTP-U tunnel is the Tunnel for transmitting the retransmission data packet (or the final (last) data packet);

Method 2: configuring a special IP address to indicate that the packet containing the IP address is a retransmission data packet (or the final (last) data packet), and using the IP address information of the transmitting side and/or receiving side to indicate that whether the data packet containing the IP address is a retransmission data packet (or the final (last) data packet);

Method 3: configuring the information of the data packet header (for example, the IP header) to indicate that the data packet is a retransmitted packet (or the final (last) data packet).

In order to ensure that each node in the IAB network (for example, the DU of the anchor node) can learn whether a data packet that needs to be forwarded is a retransmission data packet (or the final (last) data packet), this embodiment of the present application also provides an information configuration method, which is executed by the CU of the anchor node. As shown in FIG. 11, the method may include:

Step 1101: transmitting a configuration request message of a retransmission data packet or the final (last) data packet to a distributed unit (DU) of an anchor node;

Step 1102: receiving a configuration response message returned by the DU of the anchor node based on the configuration request message.

In an optional embodiment of the present application, in order to implement any one of the above three methods, the configuration request message includes at least one of the following information:

information related to GPRS GTP-U tunnel;

information related to the IP address;

information related to the data packet header;

identification information of the user to which the data packet belongs;

identification information of the user radio bearer to which the data packet belongs;

identification information of the path to which the data packet belongs;

identification information of the backhaul link channel to which the data packet belongs;

identification information or address information of the destination receiving node (for example, the accessing relay node of the user to which the data packet belongs) of the data packet;

identification information or address information of the source transmitting node of the data packet;

identification information or address information of the node to which the data packet belongs.

The message carried in the configuration request message indicates the relevant information used to transmit the retransmission data packet (or the final (last) data packet). After the DU of the anchor node receives the configuration request message, it can perform the relevant configuration related to the retransmission data packet (or the final (last) data packet) based on the information carried in the message. For example, the above information related to the IP address may specifically be relevant information indicating an IP address used to transmit a retransmission data packet (or a final (last) data packet).

It should be noted that when there are multiple types of messages carried in the configuration message request, different messages can be used in combination to indicate the data packet referred by the resource configuration of the retransmission data packet (or the final (last) data packet). For example, in an optional embodiment, identification information of the user to which a data packet belongs and information related to the IP address may be used in combination, then the information related to the IP address used when transmitting the retransmission data packet (or the final (last) data packet) of the user indicated by the identification information can be indicated.

In an optional embodiment of the present application, the information related to the GTP-U tunnel in the configuration request message includes at least one of the following information:

indication information indicating the allocation of GTP-U tunnel information for receiving a retransmission data packet (or the final (last) data packet);

GTP-U tunnel information that the CU of the anchor node uses to transmit the retransmission data packet (or the final (last) data packet);

GTP-U tunnel information that the DU of the anchor node uses to receive the retransmission data packet (or the final (last) data packet);

GTP-U tunnel information that the DU of the anchor node uses to transmit the retransmission data packet (or the final (last) data packet);

GTP-U tunnel information that the CU of the anchor node uses to receive the retransmission data packet (or the final (last) data packet).

Wherein, the above GTP-U tunnel information of the retransmission data packet (or the final (last) data packet) may include, but is not limited to, information such as the TEID and/or IP address of the retransmission data packet (or the final (last) data packet). For the GTP-U tunnel information that the CU of the anchor node transmits the retransmission data packet (or the final (last) data packet), this information can be the TED that the CU of the anchor node transmits the retransmission data packet (or the final (last) data packet), or the IP address that the CU of the anchor transmits the retransmission data packet (or the final (last) data packet), or the TED and IP address that the CU of the anchor node transmits the retransmission data packet (or the final (last) data packet).

In an optional embodiment of the present application, the information related to the IP address in the configuration request message includes at least one of the following information:

indication information indicating the allocation of an IP address for receiving a retransmission data packet (or the final (last) data packet);

IP address that the CU of the anchor node uses to transmit the retransmission data packet (or the final (last) data packet);

IP address that the DU of the anchor node uses to receive the retransmission data packet (or the final (last) data packet);

IP address that the CU of the anchor node uses to transmit the retransmission data packet (or the final (last) data packet);

IP address that the DU of the anchor node uses to receive the retransmission data packet (or the last data packet).

In an optional embodiment of the present application, the information related to the data packet header in the configuration request message includes at least one of the following information:

location of the indication information indicating the data packet is a retransmission data packet (or the last (final) data packet) in the data packet transmitted by the CU of the anchor node to the DU of the anchor node;

content of the indication information contained in the retransmission data packet (or the final (last) data packet) when the data packet transmitted by the CU of the anchor node to the DU of the anchor node is a retransmission data packet (or the final (last) data packet), for example, this content may be the information set for DSCP (Differentiated Services Code Point) and/or flow label field in the IP header when indicating that the data packet is the retransmission data packet (or the final (last) data packet);

location of the indication information indicating the data packet is a retransmission data packet (or the final (last) data packet) in the data packet transmitted by the DU of the anchor node to the CU of the anchor node;

content of the indication information contained in the data packet when the data packet transmitted by the DU of the anchor node to the CU of the anchor node is a retransmission data packet (or the final (last) data packet), for example, the information set for the DSCP/flow label field in the IP header when indicating the data packet is a retransmission data packet (or the final (last) data packet).

The configuration response message 1102 corresponding to the configuration request information 1101 is mainly used to confirm the information in Step 1101. It is clear to those skilled in the art that the configuration response message 1102 corresponds to the configuration request information 1101, and the DU of the anchor node completes the configuration of the information related to the retransmission data packet (or the final (last) data packet) according to the configuration request information 1101 received from the CU of the anchor node, and give the confirmation information to the CU of the anchor node. In an optional embodiment of the present application, the configuration response message may include at least one of the following information:

Information related to the GTP-U tunnel;

information related to the IP address;

information related to the data packet header;

identification information of the user to which the data packet belongs;

identification information of the user radio bearer to which the data packet belongs;

identification information of the path to which the data packet belongs;

identification information of the backhaul link channel to which the data packet belongs;

identification information or address information of the destination receiving node (for example, the accessing relay node of the user to which the data packet belongs) of the data packet;

identification information or address information of the source transmitting node of the data packet;

identification information or address information of the node to which the data packet belongs.

In an optional embodiment of the present application, the information related to the GTP-U tunnel in the configuration response message includes at least one of the following information:

GTP-U tunnel information that the CU of the anchor node transmits the retransmission data packet (or the final (last) data packet);

GTP-U tunnel information that the DU of the anchor node receives the retransmission data packet (or the final (last) data packet);

GTP-U tunnel information that the DU of the anchor node transmits the retransmission data packet (or the final (last) data packet);

GTP-U tunnel information that the CU of the anchor node receives the retransmission data packet (or the final (last) data packet).

In an optional embodiment of the present application, the information related to the IP address in the configuration response message includes at least one of the following information:

IP address that the CU of the anchor node uses to transmit the retransmission data packet (or the final (last) data packet);

IP address that the DU of the anchor node uses to receive the retransmission data packet (or the final (last) data packet);

IP address that the CU of the anchor node uses to transmit the retransmission data packet (or the final (last) data packet);

IP address that the DU of the anchor node uses to receive the retransmission data packet (or the final (last) data packet).

In an optional embodiment of the present application, the information related to the data packet header in the configuration response message includes at least one of the following information:

location of the indication information indicating that the data packet is a retransmission data packet (or the final (last) data packet) in the data packet transmitted by the CU of the anchor node to the DU of the anchor node;

content of the indication information contained in the retransmission data packet (or the final (last) data packet) when the data packet transmitted by the CU of the anchor node to the DU of the anchor node is a retransmission data packet (or the final (last) data packet), for example, the information set for DSCP and/or flow label field in the IP header to indicate that the data packet is the retransmission data packet (or the final (last) data packet);

location of the indication information indicating that the data packet is a retransmission data packet (or the final (last) data packet) in the data packet transmitted by the DU of the anchor node to the CU of the anchor node;

content of the indication information contained in the data packet when the data packet transmitted by the DU of the anchor node to the CU of the anchor node is a retransmission data packet (or the final (last) data packet), for example, the information set for the DSCP/flow label field in the IP header when indicating the data packet is a retransmission data packet (or the final (last) data packet).

Based on the configuration process of the information configuration method provided in the embodiment of the present application, the CU of the anchor node and/or the DU of the anchor node can learn whether the received data packet is a retransmission data packet (or the last data packet).

Based on the same principle as the resource management method shown in FIG. 3, an embodiment of the present application also provides a resource management method. The method may be specifically executed by a second node and include:

receiving a backhaul link resource management request transmitted by the first node, where the resource management request includes information related to the backhaul link resources referred by the resource management request;

transmitting a first request response message to the first node according to the resource management request.

It is clear to those skilled in the art that this method has the same principle as that in the method shown in FIG. 3, but the description of the method from the different execution subject sides, specifically, the resource management method shown in FIG. 3 is described using the first node as the execution subject of the method, and the method is described using the second node as the execution subject of the method. For the example shown in FIG. 4, the method shown in FIG. 3 is described using the transmitting party of the configuration request message 401 as the execution subject, and the method is described using the receiving party of the configuration request message 401 as the execution subject. For a detailed description of the method, reference may be made to the corresponding description of the above method shown in FIG. 3.

Optionally, the first node and the second node include any of the following:

the first node is an anchor node, and the second node is a relay node or a DU of a relay node;

the first node is a CU of an anchor node, and the second node is a DU of an anchor node, a relay node, or a DU of a relay node;

the first node is a relay node or a DU of a relay node, and the second node is an anchor node or a CU of an anchor node;

the first node is a DU of an anchor node, and the second node is a CU of an anchor node;

Wherein, if the first node is an anchor node or a CU of an anchor node, the resource management request is the first resource configuration request; if the first node is a relay node, or a DU of a relay node, or a DU of an anchor node, the resource management request is the first resource setup modification request.

Optionally, the backhaul link resource includes at least one of a backhaul link channel and a user radio bearer; wherein the user radio bearer includes at least one of the following:

DRB, SRB and E-RAB.

Optionally, if the resource management request is a first resource configuration request, the information related to the backhaul link resources referred by the resource management request includes at least one of the following information:
  identification information of at least one user referred by the resource management request;
  identification information of the backhaul link resources referred by the resource management request;
  information related to QoS of the backhaul link resources serving at least one user;
  if the resource management request is a first resource configuration modification request, the information related to the backhaul link resources referred by the resource management request includes at least one of the following information:
  identification information of at least one user referred by the resource management request;
  information related to the QoS of the backhaul link resources requested to be modified.
Optionally, the information related to the QoS of the backhaul link resources serving at least one user includes at least one of the following:
  QoS information of the backhaul link resources;
  The desired or requested QoS information to be satisfied for the backhaul link resources;
  The maximum desired or requested QoS information to be satisfied for the backhaul link resources;
  The minimum desired or requested QoS information to be satisfied for the backhaul link resources;
  feedback indication information indicating information that the second node needs to give a feedback;
  the information related to the QoS of the backhaul link resources requested to be modified includes at least one of the following:
  indication information indicating QoS information of backhaul link resources that cannot be satisfied by the first node;
  QoS information of the backhaul link resources that cannot be satisfied by the first node;
  cause information that the backhaul link cannot be satisfied by the first node;
  indication information indicating QoS information of backhaul link resources that can be satisfied by the first node;
  QoS information of backhaul link resources that can be satisfied by the first node;
  configuration information of the first node.
Optionally, if the resource management request is a first resource configuration request, the first request response message also includes at least one of the following information:
  identification information of at least one user referred by the first request response message;
  information related to the backhaul link resources accepted by the second node;
  information related to the backhaul link resources not accepted by the second node;
  configuration information of the second node.
Optionally, if the resource management request is a first resource configuration modification request, the first request response message also includes at least one of the following:
  identification information of at least one user referred by the first request response message;
  information related to the backhaul link resources that the second node agrees to modify;
  information related to the backhaul link resources that the second node disagrees to modify;
  RRC message which is necessary for the first node to configure the user;
  indication information indicating the first node to use the configuration information of the first node when configuring the user.
Optionally, the information related to the backhaul link resources accepted by the second node includes at least one of the following:
  identification information of the backhaul link resources;
  indication information for indicating the QoS information satisfied by the second node;
  QoS information satisfied by the second node;
  information fed back based on the feedback indication information included in the first resource configuration request;
  information related to the backhaul link resources not accepted by the second node includes at least one of the following:
  identification information of the backhaul link resources;
  indication information for indicating QoS information that is not satisfied by the second node;
  QoS information not satisfied by the second node;
  QoS information that can be satisfied by the second node;
  information fed back based on the feedback indication information included in the first resource configuration request;
  cause information that the second node does not accept the backhaul link;
  information related to the backhaul link resources that the second node agrees to modify includes any of the following:
  identification information of the backhaul link resources that the second node agrees to modify;
  identification information of the backhaul link resources that the second does not agree to modify;
  information related to the backhaul link resources that the second node disagrees to modify includes at least one of the following:
  identification information of the backhaul link resources that the second does not agree to modify;
  QoS information of the backhaul link resources needs to be satisfied by the first node;
  indication information for indicating configuration information of the backhaul link resources needs to be used by the first node.
Optionally, if the resource management request is a first resource configuration request, requesting the first node to transmit a first request response message according to the resource management request includes:
  transmitting a second resource modification request to the first node based on the first resource configuration request;
  receiving a second request response message transmitted by the first node based on the second resource modification request;
  returning a first request response message based on the second request response message and the first resource configuration request.
Optionally, if the resource management request is a first resource configuration modification request, requesting to transmit a first request response message to the first node according to the resource management request includes:
  transmitting a second resource configuration request to the first node based on the first resource configuration modification request;

receiving a third request response message returned by the first node based on the second resource configuration request;

transmitting a first request response message to the first node based on the third request response message and the first resource configuration modification request.

Optionally, if the first node communicates with the second node through at least a third node, and the resource management request is a first resource configuration modification request, requesting the first node to transmit a first request response message according to the resource management request includes:

transmitting a third resource configuration request to at least a third node based on the first resource configuration modification request;

receiving a fourth request response message returned by the third node based on the third resource configuration request;

transmitting a first request response message to the first node according to the fourth request response information and the first resource configuration modification request.

Optionally, the at least one user includes at least one of the following:

UE, relay node, relay node other than the first node or the second node.

Based on the same principle as the method shown in FIG. 10, an embodiment of the present application also provides a control information transmission method, which may be executed by a fifth node. The method may specifically include:

receiving a data packet transmitted by a fourth node, the data packet including control information related to user data;

transmitting the data packet based on the control information;

wherein, the fourth node and the fifth node are nodes in the IAB network.

Optionally, the fourth node and the fifth node include any of the following:

the fourth node and the fifth node are relay nodes in the IAB network;

one of the fourth node and the fifth node is a distributed unit of the anchor node in the IAB network, and the other is a relay node in the IAB network.

Optionally, the data packet includes at least one of the following information:

user data;

indication information of identification information of the user to which the data packet belongs;

indication information of identification information of a user radio bearer to which the data packet belongs;

indication information of identification information of a backhaul link channel to which the data packet belongs;

indication information of identification information of a path to which the data packet belongs;

indication information of identification information of a destination receiving node to which the data packet belongs;

indication information of identification information of a source transmitting node to which the data packet belongs;

indication information of identification information of a relay node accessed by the user to which the data packet belongs;

indication information of data packet type;

indication information of the data rate used when the fourth node desires the fifth node to transmit data to the four data;

indication information related to a channel status when a distributed unit of the fourth node transmits and receives data.

Optionally, the indication information of the data packet type includes at least one of indication information used to indicate that the data packet is a retransmission data packet and indication information used to indicate that the data packet is the final (last) data packet.

It is clear to those skilled in the art that, for a detailed description of the control information transmission method in each of the above optional embodiments, reference may be made to the above corresponding description of the control information transmission method shown in FIG. 10.

Based on the same principle as the method shown in FIG. 11, an embodiment of the present application also provides an information configuration method. The method may be specifically executed by an DU of the anchor node. The method may include:

receiving a configuration request message of the retransmission data packet or the final (last) data packet transmitted by the CU of the anchor node;

configuring the information related to the retransmission data packet or the final (last) data packet according to the configuration request information, and transmitting a configuration response message to the CU of the anchor node.

Optionally, the configuration request message includes at least one of the following information:

information related to the GTP-U tunnel;

information related to the IP address;

information related to the data packet header;

identification information of the user to which the data packet belongs;

identification information of the user radio bearer to which the data packet belongs;

identification information of the path to which the data packet belongs;

identification information of the backhaul link channel to which the data packet belongs;

identification information or address information of the destination receiving node of the data packet;

identification information or address information of the source transmitting node of the data packet;

identification information or address information of the node to which the data packet belongs.

Optionally, the information related to the GTP-U tunnel in the configuration request message includes at least one of the following information:

indication information indicating the allocation of GTP-U tunnel information for receiving a retransmission data packet or the final (last) data packet;

GTP-U tunnel information that the CU of the anchor node uses to transmit the retransmission data packet or the final (last) data packet;

GTP-U tunnel information that the DU of the anchor node uses to receive the retransmission data packet or the final (last) data packet;

GTP-U tunnel information that the DU of the anchor node uses to transmit the retransmission data packet (or the final (last) data packet);

GTP-U tunnel information that the CU of the anchor node uses to receive the retransmission data packet (or the final (last) data packet).

Optionally, the information related to the IP address in the configuration request message includes at least one of the following information:
- indication information indicating the allocation of an IP address for receiving a retransmission data packet (or the final (last) data packet);
- IP address that the CU of the anchor node uses to transmit the retransmission data packet (or the final (last) data packet);
- IP address that the DU of the anchor node uses to receive the retransmission data packet (or the final (last) data packet);
- IP address that the CU of the anchor node uses to transmit the retransmission data packet (or the final (last) data packet);
- IP address that the DU of the anchor node uses to receive the retransmission data packet (or the final (last) data packet).

Optionally, the information related to the data packet header in the configuration request message includes at least one of the following information:
- location of the indication information indicating that the data packet is a retransmission data packet (or the final (last) data packet) in the data packet transmitted by the CU of the anchor node to the DU of the anchor node;
- content of the indication information contained in the retransmission data packet (or the final (last) data packet) when the data packet transmitted by the CU of the anchor node to the DU of the anchor node is a retransmission data packet (or the final (last) data packet);
- location of the indication information indicating that the data packet is a retransmission data packet (or the final (last) data packet) in the data packet transmitted by the DU of the anchor node to the CU of the anchor node;
- content of the indication information contained in the data packet when the data packet transmitted by the DU of the anchor node to the CU of the anchor node is a retransmission data packet (or the final (last) data packet).

Optionally, the configuration response message includes at least one of the following information:
- information related to the GTP-U tunnel;
- information related to the IP address;
- information related to the data packet header;
- identification information of the user to which the data packet belongs;
- identification information of the user radio bearer to which the data packet belongs;
- identification information of the path to which the data packet belongs;
- identification information of the backhaul link channel to which the data packet belongs;
- identification information or address information of the destination receiving node of the data packet;
- identification information or address information of the source transmitting node of the data packet;
- Identification information or address information of the node to which the data packet belongs.

Optionally, the information related to the GTP-U tunnel in the configuration response message includes at least one of the following information:
- GTP-U tunnel information that the CU of the anchor node uses to transmit the retransmission data packet (or the final (last) data packet);
- GTP-U tunnel information that the DU of the anchor node uses to receive the retransmission data packet (or the final (last) data packet);
- GTP-U tunnel information that the DU of the anchor node uses to transmit the retransmission data packet (or the final (last) data packet);
- GTP-U tunnel information that the CU of the anchor node uses to receives the retransmission data packet (or the final (last) data packet).

Optionally, the information related to the IP address in the configuration response message includes at least one of the following information:
- IP address that the CU of the anchor node uses to transmit the retransmission data packet (or the final (last) data packet);
- IP address that the DU of the anchor node uses to receive the retransmission data packet (or the final (last) data packet);
- IP address that the CU of the anchor node uses to transmit the retransmission data packet (or the final (last) data packet);
- IP address that the DU of the anchor node uses to receive the retransmission data packet (or the final (last) data packet).

Optionally, the information related to the data packet header in the configuration response message includes at least one of the following information:
- location of the indication information indicating that the data packet is a retransmission data packet (or the final (last) data packet) in the data packet transmitted by the CU of the anchor node to the DU of the anchor node;
- content of the indication information contained in the retransmission data packet (or the final (last) data packet) when the data packet transmitted by the CU of the anchor node to the DU of the anchor node is a retransmission data packet (or the final (last) data packet);
- location of the indication information indicating that the data packet is a retransmission data packet (or the final (last) data packet) in the data packet transmitted by the DU of the anchor node to the CU of the anchor node;
- content of the indication information contained in the data packet when the data packet transmitted by the DU of the anchor node to the CU of the anchor node is a retransmission data packet (or the final (last) data packet).

An embodiment of the present application also provides an information interaction system, and the information interaction system includes at least one of the apparatus provided in the above embodiments of the present application.

The embodiment of the present application also provides a communication network system, which includes the above information interaction system provided in the embodiment of the present application.

An embodiment of the present application also provides an electronic device. The electronic device includes a processor and a memory. Wherein, the memory stores machine-readable instructions; and the processor is configured to execute machine-readable instructions to implement the method provided in any embodiment of the present application.

Another embodiment of the present application provides a computer-readable storage medium, which stores a computer program. When the computer program is executed by a processor, the method provided by any embodiment of the present application is implemented.

In an optional embodiment, an electronic device is provided. As shown in FIG. 12, the electronic device 1200 shown in FIG. 12 includes a controller/processor 1201 and a memory 4003. Wherein, the controller/processor 1201 and the memory 1203 are connected, for example, via a bus 1202. Optionally, the electronic device 1200 may also include a transceiver 1204. It should be noted that, in practical applications, the transceiver 1204 is not limited to one, and the structure of the electronic device 1200 does not limit the embodiments of the present application.

The controller/processor 1201 may be a CPU (Central Processing Unit), a general-purpose processor, a DSP (Digital Signal Processor), an ASIC (Application Specific Integrated Circuit), or an FPGA (Field Programmable Gate Array) or other programmable logic devices, transistor logic devices, hardware components or any combination thereof. It may implement or execute various exemplary logical blocks, modules, and circuits described in connection with the disclosure of the present application. The controller/processor 1201 may also be a combination that realizes a computing function, for example, a combination including one or more microprocessors, a combination of a DSP and a microprocessor, and the like.

The bus 1202 may include a path for transmitting information between the above components. The bus 4002 may be a PCI (Peripheral Component Interconnect) bus or an EISA (Extended Industry Standard Architecture) bus, or the like. The bus 1202 can be divided into an address bus, a data bus, a control bus, and the like. For ease of representation, only a thick line is used in FIG. 12, but it does not mean that there is only one bus or one type of bus.

The memory 1203 may be a ROM (Read Only Memory) or other type of static storage device that can store static information and instructions, a RAM (Random Access Memory), or other type of dynamic storage device that can store information and instructions, which can also be an EEPROM (Electrically Erasable Programmable Read Only Memory), a CD-ROM (Compact Disc Read Only Memory) or other optical disk storage, compact disk storage (including compact optical discs, laser discs, optical discs, digital versatile discs, Blu-ray discs, etc.), disk storage media or other magnetic storage devices, or any other medium can be used to carry or store desired program codes in the form of instructions or data structures and can be accessed by a computer, but not limited to this.

The memory 1203 is configured to store application program codes for executing the solution of the present application, and the controller/processor 1201 controls execution. The controller/processor 1201 is configured to execute application program codes stored in the memory 1203 to implement the content shown in any one of the above method embodiments.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they can be performed in other orders. Moreover, at least a part of the steps in the flowchart of the drawing may include multiple sub-steps or multiple stages. These sub-steps or stages are not necessarily performed at the same time, but may be performed at different times. The execution order is also not necessarily performed sequentially, but may be performed in turn or alternately with other steps or at least a part of the sub-steps or stages of other steps.

The above description is only part of the embodiments of the present invention. It should be noted that, for those of ordinary skill in the art, without departing from the principles of the present invention, several improvements and retouches can be made. These improvements and retouches also should be regarded as the protection scope of the present invention.

The invention claimed is:

1. A resource management method performed by a first node in a wireless communication system, the method comprising:
   transmitting, to a second node, a first backhaul link resource management request including a first resource configuration request, wherein the first backhaul link resource management request includes first information on backhaul link resources;
   receiving, from the second node, a second backhaul link resource management request including a first resource configuration modification request in response to the first resource configuration request, wherein the second backhaul link resource management request includes second information on backhaul link resources;
   transmitting, to the second node, a first resource configuration modification request response; and
   receiving, from the second node, a first request response message based on the first resource configuration request and the first resource configuration modification request response.

2. The method of claim 1,
   wherein the first information on the backhaul link resources referred by the first backhaul link resource management request includes at least one of following information:
      identification information of at least one user referred by the first backhaul link resource management request;
      identification information of the backhaul link resources referred by the first backhaul link resource management request; or
      information on quality of service (QOS) of the backhaul link resources serving the at least one user, and
   wherein the first request response message includes at least one of following information:
      identification information of at least one user referred by the first request response message;
      information on the backhaul link resources accepted by the second node;
      information on the backhaul link resources not accepted by the second node; or
      configuration information of the second node.

3. The method of claim 1,
   wherein the second information on the backhaul link resources referred by the second backhaul link resource management request comprises at least one of following information:
      identification information of at least one user referred by the second backhaul link resource management request;
      identification information of the backhaul link resources referred by the second backhaul link resource management request; or
      information on quality of service (QOS) of the backhaul link resources requested to be modified, and
   wherein the first resource configuration modification request response comprises at least one of the following:

identification information of at least one user referred by the first request response message;
information on the backhaul link resources that the second node agrees to modify;
information on the backhaul link resources that the second node does not agree to modify;
radio resource control (RRC) message required, by the first node, for configuring a user; or
configuration information of the first node used while indicating the first node to configure the user.

4. A resource management method performed by a second node in a wireless communication system, the method comprising:
receiving, from a first node, a first backhaul link resource management request including a first resource configuration request, wherein the first backhaul link resource management request includes first information on backhaul link resources referred by the first backhaul link resource management request;
transmitting, to the first node, a second backhaul link resource management request including a first resource configuration modification request in response to the first resource configuration request, wherein the second backhaul link resource management request includes second information on backhaul link resources;
receiving, from the first node, a first resource configuration modification request response; and
transmitting, to the first node, a first request response message based on the first resource configuration request and the first resource configuration modification request response.

5. The method of claim 4,
wherein the first information on the backhaul link resources referred by the first backhaul link resource management request includes at least one of following information:
identification information of at least one user referred by the first backhaul link resource management request;
identification information of the backhaul link resources referred by the first backhaul link resource management request; or
information on quality of service (QOS) of the backhaul link resources serving the at least one user, and
wherein the first request response message includes at least one of following information:
identification information of at least one user referred by the first request response message;
information on the backhaul link resources accepted by the second node;
information on the backhaul link resources not accepted by the second node; or
configuration information of the second node.

6. The method of claim 4,
wherein the second information on the backhaul link resources referred by the second backhaul link resource management request comprises at least one of following information:
identification information of at least one user referred by the second backhaul link resource management request;
identification information of the backhaul link resources referred by the second backhaul link resource management request; or
information on quality of service (QOS) of the backhaul link resources requested to be modified, and wherein the first resource configuration modification request response comprises at least one of the following:
identification information of at least one user referred by the first request response message;
information on the backhaul link resources that the second node agrees to modify;
information on the backhaul link resources that the second node does not agree to modify;
radio resource control (RRC) message required, by the first node, for configuring a user; or
configuration information of the first node used while indicating the first node to configure the user.

7. A first node in a wireless communication system, the first node comprising:
a transceiver configured to transmit and receive a signal; and
a controller coupled with the transceiver and configured to:
transmit, to a second node, a first backhaul link resource management request including a first resource configuration request, wherein the first backhaul link resource management request includes first information on backhaul link resources,
receive, from the second node, a second backhaul link resource management request including a first resource configuration modification request in response to the first resource configuration request, wherein the second backhaul link resource management request includes second information on backhaul link resources,
transmit, to the second node, a first resource configuration modification request response, and
receive, from the second node, a first request response message based on the first resource configuration request and the first resource configuration modification request response.

8. The first node of claim 7,
wherein the first information on the backhaul link resources referred by the first backhaul link resource management request includes at least one of following information:
identification information of at least one user referred by the first backhaul link resource management request;
identification information of the backhaul link resources referred by the first backhaul link resource management request; or
information on quality of service (QOS) of the backhaul link resources serving the at least one user, and
wherein the first request response message includes at least one of following information:
identification information of at least one user referred by the first request response message;
information on the backhaul link resources accepted by the second node;
information on the backhaul link resources not accepted by the second node; or
configuration information of the second node.

9. The first node of claim 7,
wherein the second information on the backhaul link resources referred by the second backhaul link resource management request comprises at least one of following information:
identification information of at least one user referred by the second backhaul link resource management request;

identification information of the backhaul link resources referred by the second backhaul link resource management request; or information on quality of service (QOS) of the backhaul link resources requested to be modified, and wherein the first resource configuration modification request response comprises at least one of the following:

identification information of at least one user referred by the first request response message;

information on the backhaul link resources that the second node agrees to modify;

information on the backhaul link resources that the second node does not agree to modify;

radio resource control (RRC) message required, by the first node, for configuring a user; or configuration information of the first node used while indicating the first node to configure the user.

10. A second node in a wireless communication system, the second node comprising:

a transceiver configured to transmit and receive a signal; and a controller coupled with the transceiver and configured to:

receive, from a first node, a first backhaul link resource management request including a first resource configuration request, wherein the first backhaul link resource management request includes first information on backhaul link resources referred by the first backhaul link resource management request, transmit, to the first node, a second backhaul link resource management request including a first resource configuration modification request in response to the first resource configuration request, wherein the second backhaul link resource management request includes second information on backhaul link resources, receive, from the first node, a first resource configuration modification request response, and transmit, to the first node, a first request response message based on the first resource configuration request and the first resource configuration modification request response.

11. The second node of claim 10, wherein the first information on the backhaul link resources referred by the first backhaul link resource management request includes at least one of following information:

identification information of at least one user referred by the first backhaul link resource management request;

identification information of the backhaul link resources referred by the first backhaul link resource management request; or information on quality of service (QOS) of the backhaul link resources serving the at least one user, and wherein the first request response message includes at least one of following information:

identification information of at least one user referred by the first request response message;

information on the backhaul link resources accepted by the second node;

information on the backhaul link resources not accepted by the second node; or configuration information of the second node.

12. The second node of claim 10, wherein the second information on the backhaul link resources referred by the second backhaul link resource management request comprises at least one of following information:

identification information of at least one user referred by the second backhaul link resource management request;

identification information of the backhaul link resources referred by the second backhaul link resource management request; or information on quality of service (QOS) of the backhaul link resources requested to be modified, and wherein the first resource configuration modification request response comprises at least one of the following:

identification information of at least one user referred by the first request response message;

information on the backhaul link resources that the second node agrees to modify;

information on the backhaul link resources that the second node does not agree to modify;

radio resource control (RRC) message required, by the first node, for configuring a user; or configuration information of the first node used while indicating the first node to configure the user.

* * * * *